US007630559B2

(12) United States Patent
Ito et al.

(10) Patent No.: US 7,630,559 B2
(45) Date of Patent: Dec. 8, 2009

(54) CONFIRMATION SYSTEM FOR AUTHENTICITY OF ARTICLE AND CONFIRMATION METHOD

(75) Inventors: Kensuke Ito, Ashigarakami-gun (JP); Tadashi Shimizu, Ashigarakami-gun (JP); Hajime Sugino, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 627 days.

(21) Appl. No.: 11/282,839

(22) Filed: Nov. 21, 2005

(65) Prior Publication Data

US 2007/0118822 A1 May 24, 2007

(51) Int. Cl.

*G06K 9/62* (2006.01)
*G06K 9/68* (2006.01)
*B42D 15/00* (2006.01)
*G06K 9/00* (2006.01)
*G06K 9/18* (2006.01)

(52) U.S. Cl. ....................... 382/209; 382/218; 382/100; 382/111; 382/181; 382/204; 283/70; 283/72; 283/81; 283/109

(58) Field of Classification Search .................. 283/70, 283/72, 81, 109
See application file for complete search history.

(56) References Cited

U.S. PATENT DOCUMENTS 3,799,829 A * 3/1974 Heatwole .................... 156/235
5,521,984 A * 5/1996 Denenberg et al. .......... 382/209
5,538,753 A 7/1996 Antes et al.
5,714,213 A 2/1998 Antes et al.
5,932,119 A 8/1999 Kaplan et al.
6,211,484 B1 4/2001 Kaplan et al.
6,450,536 B1 * 9/2002 Chen et al. .................... 283/67
6,476,351 B1 11/2002 Kaplan et al.
6,684,663 B2 2/2004 Kaplan et al.
7,010,938 B2 3/2006 Kaplan et al.
7,028,188 B1 4/2006 Moore
7,265,316 B2 9/2007 Kaplan et al.
2004/0066441 A1 * 4/2004 Jones et al. ................. 347/101
2004/0159641 A1 * 8/2004 Kaplan et al. .......... 219/121.68
2005/0103760 A1 5/2005 Kaplan et al.
2005/0200154 A1 * 9/2005 Barbee et al. .............. 296/95.1
2008/0000885 A1 1/2008 Kaplan et al.
2008/0043220 A1 2/2008 Kaplan et al.

FOREIGN PATENT DOCUMENTS

JP A-61-009681 1/1986
JP Y 63-031074 8/1988
JP A 06-202561 7/1994
JP A 09-197968 7/1997
JP A 11-277963 10/1999
JP A 2001-283011 10/2001
JP A 2001-357377 12/2001

* cited by examiner

*Primary Examiner*—Andrew W Johns
*Assistant Examiner*—Thomas A Conway
(74) *Attorney, Agent, or Firm*—Oliff & Berridge, PLC

(57) ABSTRACT

An article confirmation method has reading irreproducible fine characteristics from a genuine article, reading irreproducible fine characteristics from an article to be confirmed, comparing the irreproducible fine characteristics between the genuine article and the article to be confirmed, and determining authenticity of the article to be confirmed based on a comparison result.

25 Claims, 16 Drawing Sheets

NON-WOVEN FABRIC

1mm

PRINTED PORTION OF CD-ROM

1mm

PRINTED PORTION OF ANOTHER CD-ROM

RUBBER SURFACE

CERAMIC SURFACE

COATED SURFACE WITH METALLIC THREADS

STAINLESS(SCISSOR)

STAINLESS(THIN PLATE)SURFACE

SEMI-TRANSPARENT RESIN

LEATHER BACK SURFACE

CONFIRMATION SYSTEM FOR AUTHENTICITY OF ARTICLE AND CONFIRMATION METHOD

CROSS-REFERENCE TO RELATED APPLICATION

This application claims benefit of Japanese Patent Application No. 2003-176051, which is incorporated herein by reference in its entirety for all purposes.

BACKGROUND

1. Technical Field

The present invention relates to an article confirmation method and its device, and particularly to a method for confirming the authenticity of an article and its device.

2. Related Art

Conventionally, in order to prevent the forgery of an article of value, an important document and the like, there has been generally employed a method of recording identification code using a sophisticated printing technique or a special ink rarely offered in markets on a surface of an genuine article such as an article of value and an important document, or a method of sticking a forgery preventing sheet such as a hologram thereto. In these methods, once a pretender has learned the sophisticated printing technique, or the manufacturing technique of the special ink or the forgery preventing sheet, a massive amount of forgery is performed.

Therefore, in recent years, as a technique for making the forgery difficult, there is proposed a technique of embedding a thin, minute non-contact IC chip in which a unique ID is stored into a genuine article (in the case of a document, a unique ID is mixed into paper) (e.g. Japanese Patent Application Laid-Open (JP-A) No. 2001-283011, JP-A No. 2001-357377, JP-A No. 11-277963). In this technique, in particular, the authenticity of an article can be confirmed by using the non-contact IC chip without contacting it, so that a user does not need to do the work of placing the article into a device for confirming the authenticity, which improves convenience.

In the related art, the IC chip is required for each article, and a special process for embedding the IC chip at a manufacturing step is required, which disadvantageously increases the costs. Furthermore, a case where, after manufacturing the article, forgery prevention becomes necessary due to marketed forgery or the like cannot be addressed. Also, once a pretender has learned the manufacturing technique of the IC chip or the embedding technique, the forgery becomes possible, so that the forgery cannot be securely prevented.

Therefore, while a method of confirming the authenticity of an article using irreproducible fine characteristics (random pattern) that the article itself possesses, for example, a pattern of micro asperity on a surface or the like is considered, confirmation precision is low in this method. Specifically, the irreproducible random pattern that the article itself possesses is changed when flaws are caused or dirt sticks to the surface of the article, which disables the confirmation of the authenticity. Further, since this random pattern is also changed by change in shape of the article, it cannot be applied to an article changing its shape such as fabric products and leather products.

SUMMARY

An article confirmation method has reading irreproducible fine characteristics from a genuine article, reading irreproducible fine characteristics from an article to be confirmed, comparing the irreproducible fine characteristics between the genuine article and the article to be confirmed, and determining authenticity of the article to be confirmed based on a comparison result.

DETAILED DESCRIPTION

Random Pattern

In prior to a description of the embodiments according to the present invention, irreproducible fine characteristics that the article itself originally possesses (hereinafter, referred to as a random pattern) are described.

Figure 1:
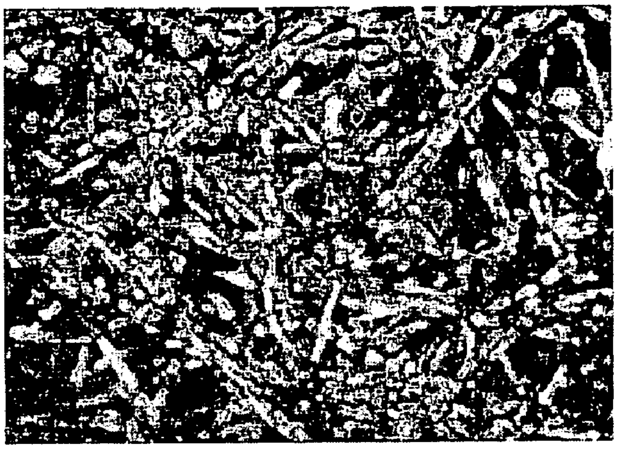
FIG. 1 is a microscopic enlarged view of a non-woven fabric surface.

FIG. 1 is a micrograph of a non-woven fabric surface. As shown in FIG. 1, the non-woven fabric is made up by complexly intertwining fibers, so that no non-woven fabric has an identical pattern by these fibers. Namely, the random pattern by the fibers can be observed from the non-woven fabric. Furthermore, although the illustration is omitted, paper is made up by complexly intertwining plant fibers and, similar to the non-woven fabric, a random pattern can be observed from paper. In even the same type and the same rod of paper, the pattern of each paper is different.

Figure 2:
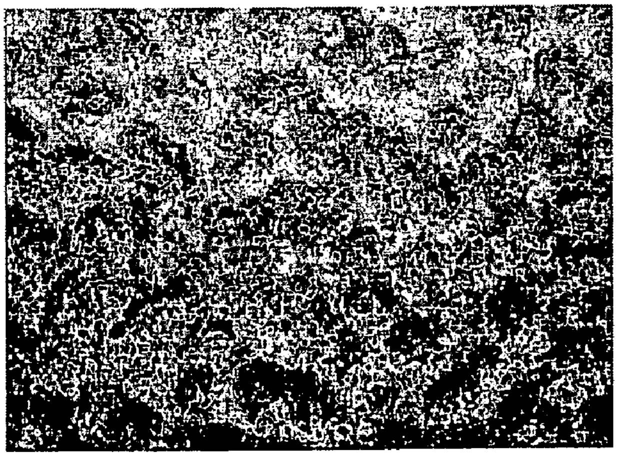
FIG. 2 is a microscopic enlarged view of a printed portion of a CD-ROM surface.
Figure 3:
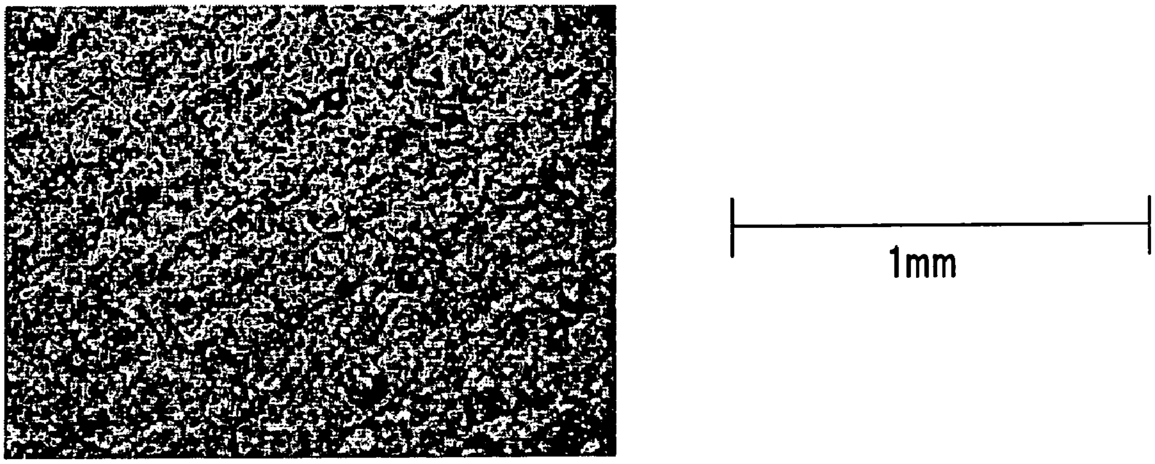
FIG. 3 is a microscopic enlarged view of a printed portion of a CD-ROM surface different from that of FIG. 2.

FIG. 2 is a micrograph of a printed portion of a commercially available CD-ROM surface (non-recording surface), and FIG. 3 is a micrograph of a printed portion of a CD-ROM surface different from that of FIG. 2. As shown in FIGS. 2, 3, in a printed surface of a CD-ROM, a random pattern is also formed by indefinite formation of a substrate, ink flow below control limit, or the like.

Figure 4:
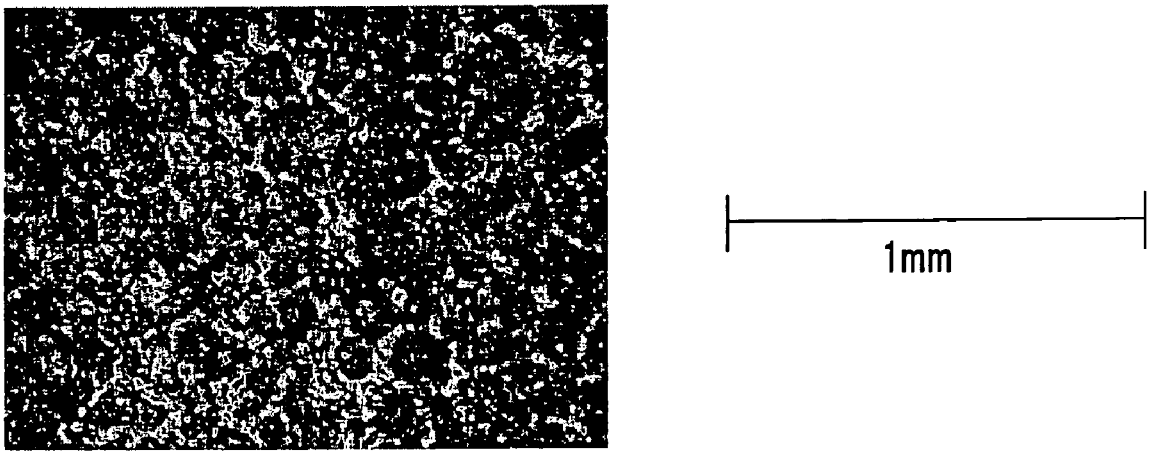
FIG. 4 is a microscopic enlarged view of a rubber surface.
Figure 5:
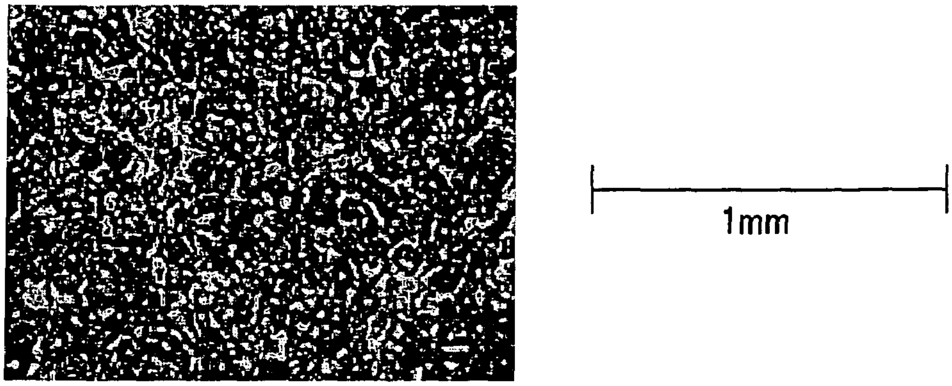
FIG. 5 is a microscopic enlarged view of a ceramic surface.
Figure 6:
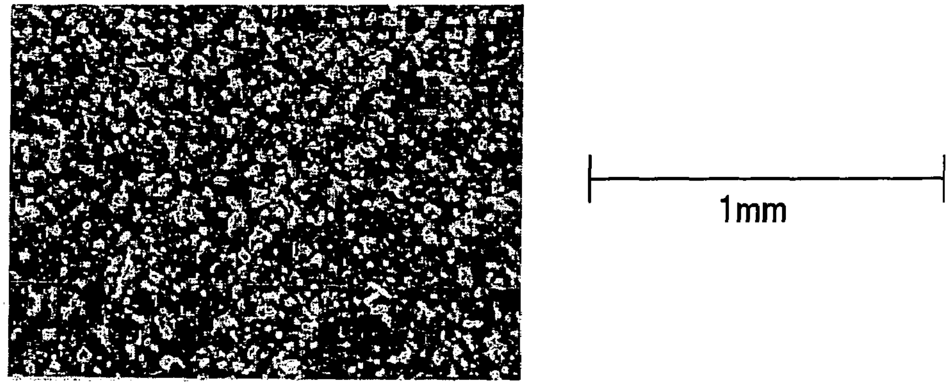
FIG. 6 is a microscopic enlarged view of a coated surface with metallic threads.

FIG. 4 is a micrograph of a black rubber surface with carbon filled, FIG. 5 is a micrograph of a ceramic surface for IC package, and FIG. 6 is a micrograph of a coating film (so-called coating with metallic threads, or lame coating) surface of a UV-cured coating material with metal micro-particles dispersed therein. As shown in FIGS. 4 to 6, a random pattern can be observed from any of the surfaces. These random patterns are formed by minute cracks on the surfaces, micro-particles of the materials and the like.

Figure 7:
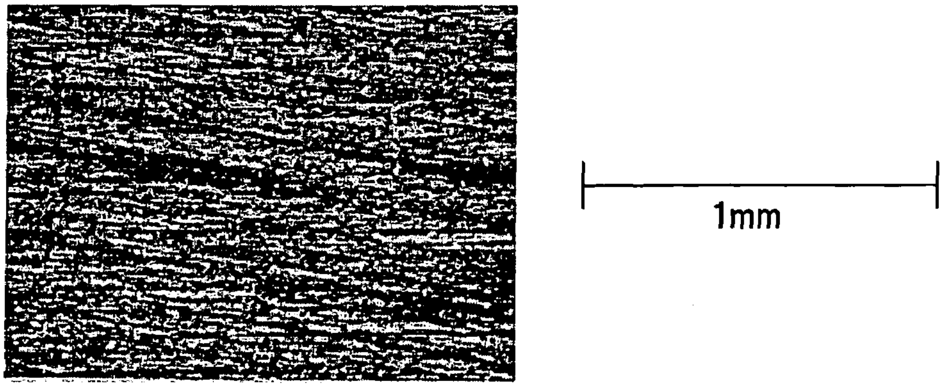
FIG. 7 is a microscopic enlarged view of a stainless steel surface.
Figure 8:
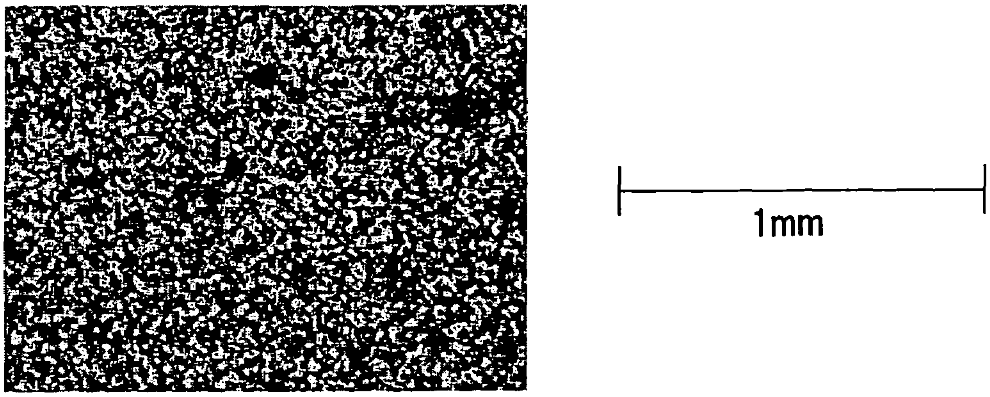
FIG. 8 is a microscopic enlarged view of a stainless steel surface different from that of FIG. 7.

FIGS. 7, 8 are micrographs of stainless steel surfaces. As shown in FIGS. 7, 8, a random pattern can also be observed on a surface of stainless steel. This random pattern is made at the time of surface finishing such as hairline processing, sand-blast processing.

Figure 9:
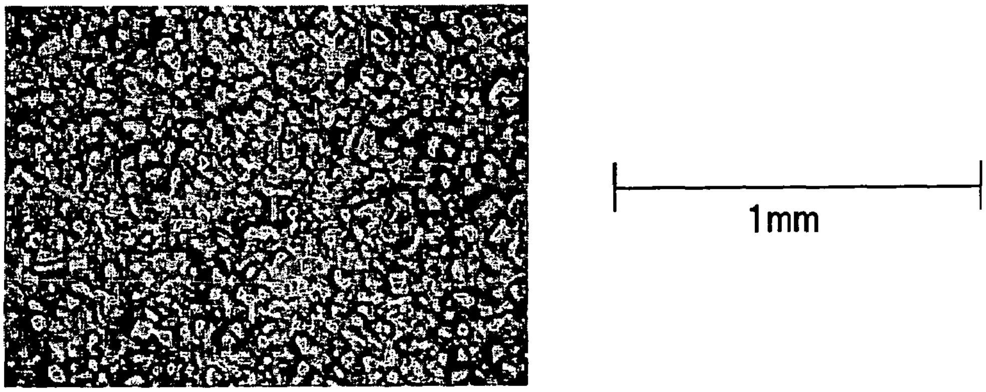
FIG. 9 is a microscopic enlarged view of semi-transparent resin.

Furthermore, FIG. 9 is a micrograph of a semi-transparent resin surface. As shown in FIG. 9, a random pattern can be also observed from the semi-transparent resin surface. This random pattern is mainly formed by particles dispersed in the resin.

Figure 10:
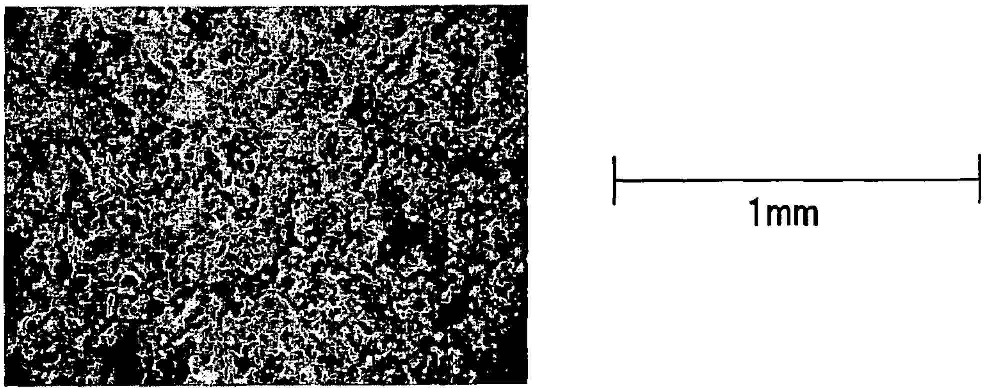
FIG. 10 is a microscopic enlarged view of a leather surface.

Furthermore, FIG. 10 is a micrograph of a leather surface. As shown in FIG. 10, in the leather, random wrinkles are also observed on the surface as a random pattern in a natural state.

As shown in FIGS. 1 to 10, random patterns can be observed from various articles. Each of these random patterns is not made by design, but is randomly made in the constitution itself of the article, in a manufacturing process, after manufacturing, or the like and it is difficult to consider that there exist a plurality of articles having completely identical patterns. Also, it is considered to be difficult to make identical patterns by design. Namely, even articles manufactured and distributed through an identical process have random patterns microscopically different from each other.

In particular, such random patterns as shown in FIGS. 1 to 10 are fine patterns at the microscopic level, and for example, gradation periods of FIGS. 5 and 6, which are considered to have been formed by micro-particles, and periods of flaws of FIGS. 7 and 8 are of micrometer order, which are very small, so that it is not easy to forge these. Furthermore, the random patterns observed from the printing inks of FIGS. 2, 3, the ceramic of FIG. 5, the metal micro-particles of FIG. 6, the metal processed surfaces of FIGS. 7, 8, and resin of FIG. 9 are very stable under normal use. The random patterns of soft materials whose shape easily varies, such as the rubber surface of FIG. 4, the leather surface of FIG. 10 and the non-woven fabric of FIG. 1. are also stable in a state in which no external force is applied.

The invention utilizes random patterns that such articles as described above originally possess as information for confirming (identifying or matching) the respective articles. For reading such fine random patterns, there are considered several methods such as a stylus method, and an electron microscope observation method, and an unprocessing and nondestructive method is desirable in terms of article protection. A method utilizing light is excellent on this point. Hereinafter, as one example of the embodiments according to the invention, an article confirming device in which a random pattern is read by utilizing light to confirm the authenticity of an article is described.

First Embodiment

Overall Configuration

Figure 11:
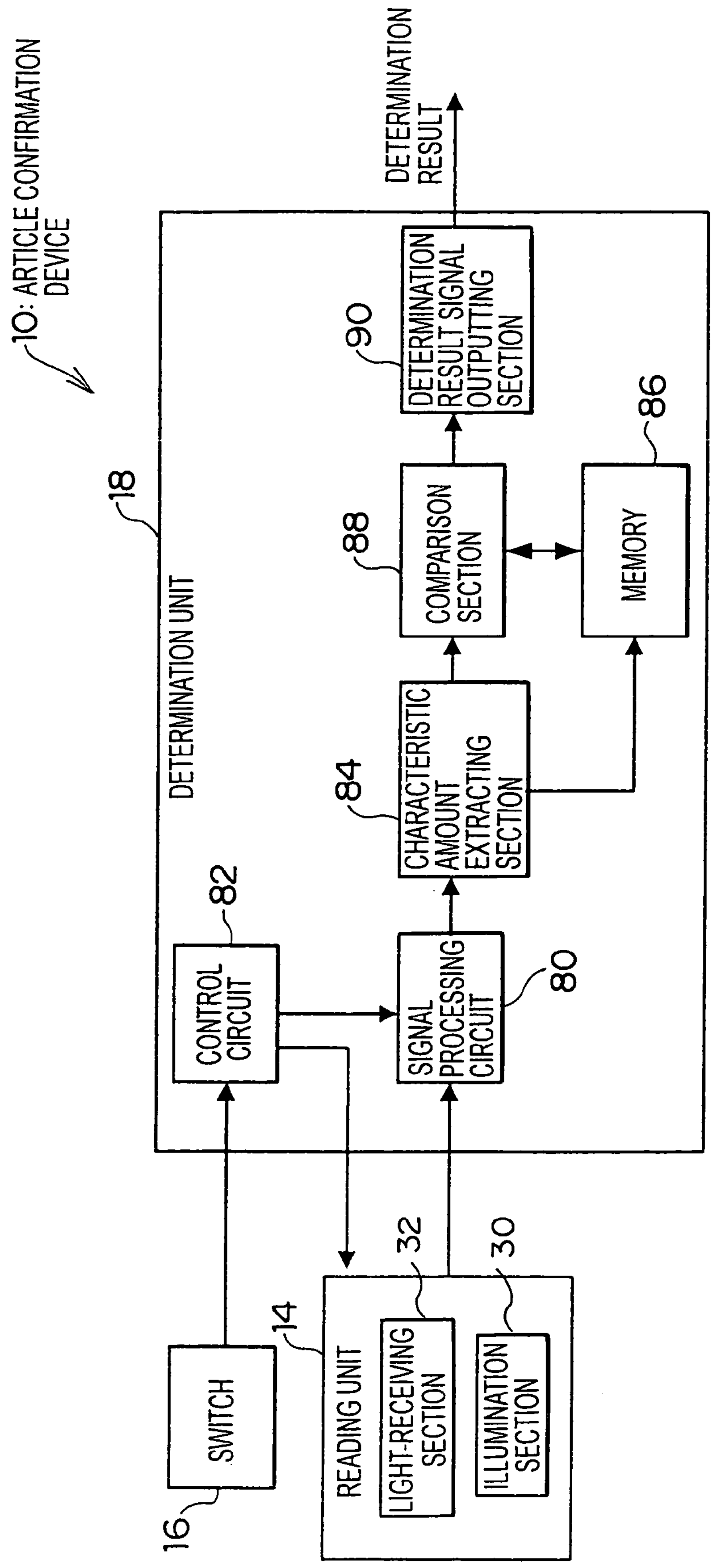
FIG. 11 is a block diagram showing a schematic configuration of an article confirming device according to a first embodiment.

FIG. 11 shows a schematic configuration diagram of an article confirming device according to a first embodiment of the invention.

As shown in FIG. 11, an article confirming device 10, includes a reading unit 14 that reads from an article 12 (refer to FIG. 12) a random pattern that the relevant article itself originally possesses, as a reading device, a switch 16 for making the reading unit 14 start reading, and a determination unit 18 that determines the authenticity (genuine or imitation) of the article 12 based on a reading result by the reading unit 14. The reading unit 14 and the switch 16 are connected to the determination unit 18. These reading unit 14, the switch 16 and the determination unit 18 may be integrated or may be configured as physically different devices and have a form in which they are connected via connection means such as a cable to be used.

The switch 16 is turned on so that after the article 12 is inserted into or brought close to the reading unit 14 and the reading unit 14 comes into a reading standby state, reading starts. This switch 16 may be a switch operated with a finger by an operator, or may be a switch that turns on by various contact or non-contact sensors when the article 12 to be read comes into contact with, or comes close to the reading unit 14 up to a predetermined distance. In the embodiment, a case where the switch 16 is operated with a finger by an operator is described as an example. A detailed description of the reading unit 14 and the determination unit 18 will be given later.

Article

Subsequently, the article 12 is described. The article 12 herein may be any kind of objects as long as they exist physically, including documents such as securities or a passport, bags, shoes, clothing, household equipment, jewelry goods, precision instruments, home electric appliances, works of art and the like, which are made of leather, wood, rubber, fiber (cloth), stone, resin, metal or the like.

As described before, the random pattern existing in an article is considered to exist stably under normal environment. As a matter of fact, there is a possibility that the pattern collapses due to flaws or dirt, and further in an article of soft material such as leather and cloth, the pattern itself is easily deformed by external force.

Figure 12A:
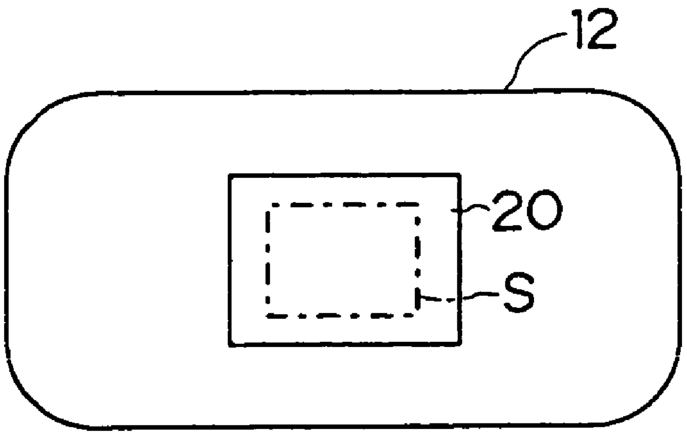
FIG. 12A is a top view of an article.
Figure 12B:
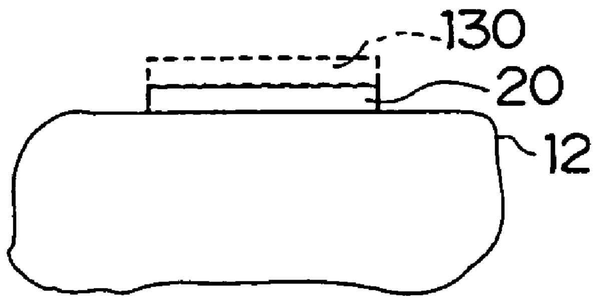
FIG. 12B is a cross-sectional view of the article.

Consequently, according to the embodiment, as shown in FIG. 12, in order to protect and fix the random pattern, a protection material 20 is, in advance, affixed to a portion including at least an observation region S of the random pattern in the surface of the article 12 to cover the observation region S by the protection material 20. The surface of the article 12 herein indicates a portion exposed to the outside regardless of front and back surfaces in a usage form of the relevant article. In FIG. 12, a top view (A) and a cross-sectional view (B) of the article 12 are shown when a surface to which the protection material 20 is affixed is an upper surface.

Figure 13:
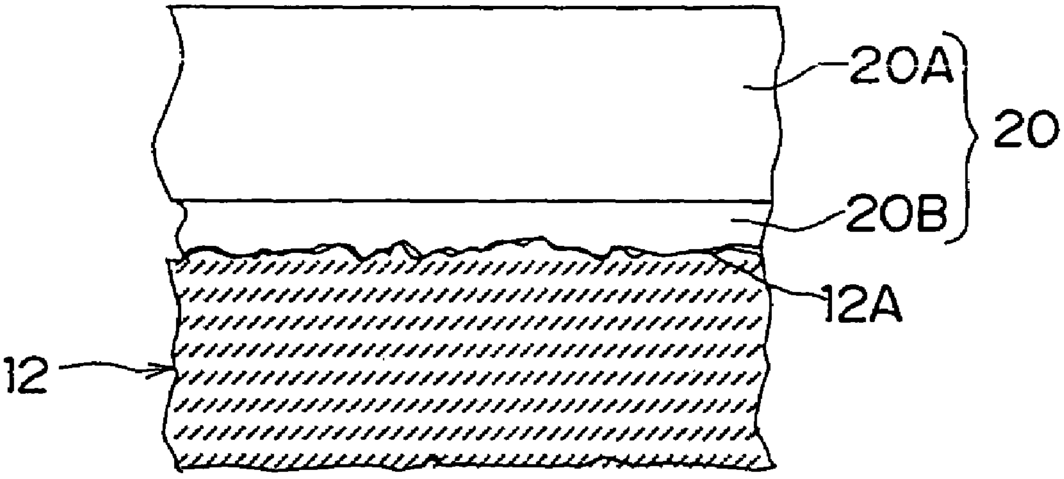
FIG. 13 is a view showing a state of an article in the case where a transparent film is used as a protection material.

Specifically, a film with an adhesive layer can be used for the protection material 20. FIG. 13 shows the article 12 when a transparent film is used as the protection material 20. FIG. 13 shows an example when a leather product is the article 12.

As shown in FIG. 13, the transparent film is stuck to a leather surface 12A of the article 12 as the protection material 20. This transparent film has a transparent protection layer 20A for protecting the article 12 from flaws and dirt and a transparent adhesive layer 20B on a surface thereof on the side affixed to the leather surface 12A. Namely, when this transparent film is stuck to the leather surface 12A as the protection material 20, the protection layer 20A and the leather surface 12A are affixed to each other by the adhesive layer 20B, so that the state of wrinkles of the leather surface 12A in the sticking portion of the transparent film, that is, the random pattern within the observation region S can be fixed and protected from flaws and dirt. Thereby, the random pattern observed within the observation region S of the article 12 can be held constant.

It is desirable that an adhesive used for the adhesive layer 20B is designed to penetrate into gaps of wrinkles or the like. Furthermore, it is desirable that it is an adhesive that is cured after being stuck so that the random pattern of the observation region S is not easily deformed by external force. Since the fixation of the random pattern is aimed at, the curing that prevents each of fine wrinkles, fibers or the like from being relatively displaced is sufficient.

Figure 14:
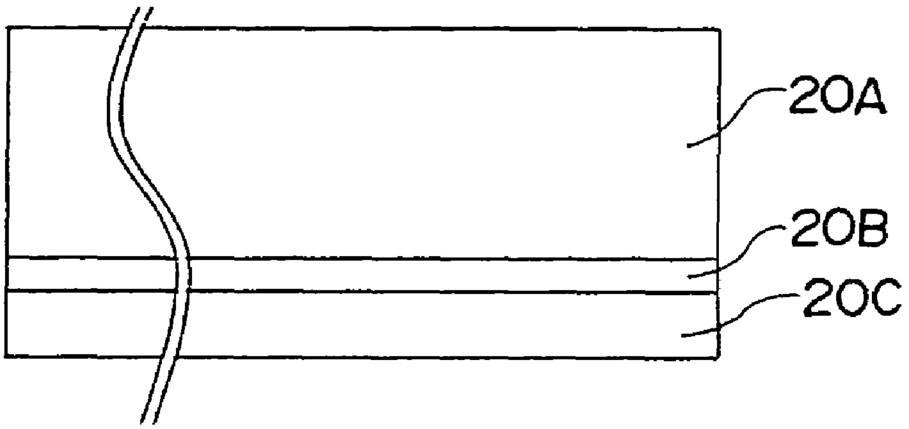
FIG. 14 is a cross-sectional view of the transparent film.

As such a transparent film, a transparent film with a structure similar to that of a transparent adhesive tape as shown in FIG. 14, for example, is preferable. This film shown in FIG. 14 is composed of the protection layer 20A which is a support of a polyester film with a thickness of 150 μm, the adhesive layer 20B made of a silicon-based adhesive material with a thickness of 25 μm, and a separator 20C of a polyester film with a thickness of 50 μm which is necessary during storage. The film materials are examples, and the invention is not particularly limited to these. For example, as the material of the protection layer 20A (support body), for example, acrylic foam, a capton film, a vinyl film or the like can be used, and as the material of the adhesive layer 20B, various materials such as rubber-based materials and silicon-based materials can be used.

Furthermore, for the protection material 20, in addition to the film with the adhesive layer as shown in FIGS. 13, 14, a transparent thermoplastic resin such as Ethylene vinyl acetate copolymer (EVA), for example, can be used. EVA having high vinyl content functions as Pressure Sensitive Adhesives (PSA) because of the characteristic of indefinite shape. In this case, only by forming EVA into a film in advance, and sticking the film to a surface of a relevant article, the EVA functions as the protection material 20. Namely, the random pattern can be fixed and protected.

While an expression of film is used to indicate the shape of the protection material 20 in the forgoing, to fix and protect the random pattern is a purpose of this protection material 20 and the ability to read the random pattern is a condition, so that any shape may be employed as long as the shape conforms to this purpose and the condition. Naturally, the thermoplastic resin as the protection material 20 may be formed into a film in advance as described above, or may have an indefinite shape and also be stabilized in shape after being bonded to the relevant article.

Detailed Configuration of Reading Unit

Subsequently, the reading unit 14 is described in detail.

The reading unit 14, as shown in FIG. 11, includes an illumination section 30 that irradiates the article 12 to be read with light, and a light receiving section 32 that receives, reflected light or transmitted light of the light emitted by the illumination section 30 from the article 12. The article 12 is irradiated with light by the illumination section 30, and its reflected light or transmitted light is received by the light receiving section 32 to thereby read the random pattern of the relevant article 12. Hereinafter, a concrete configuration example of the reading unit 14 is shown.

Figure 15:
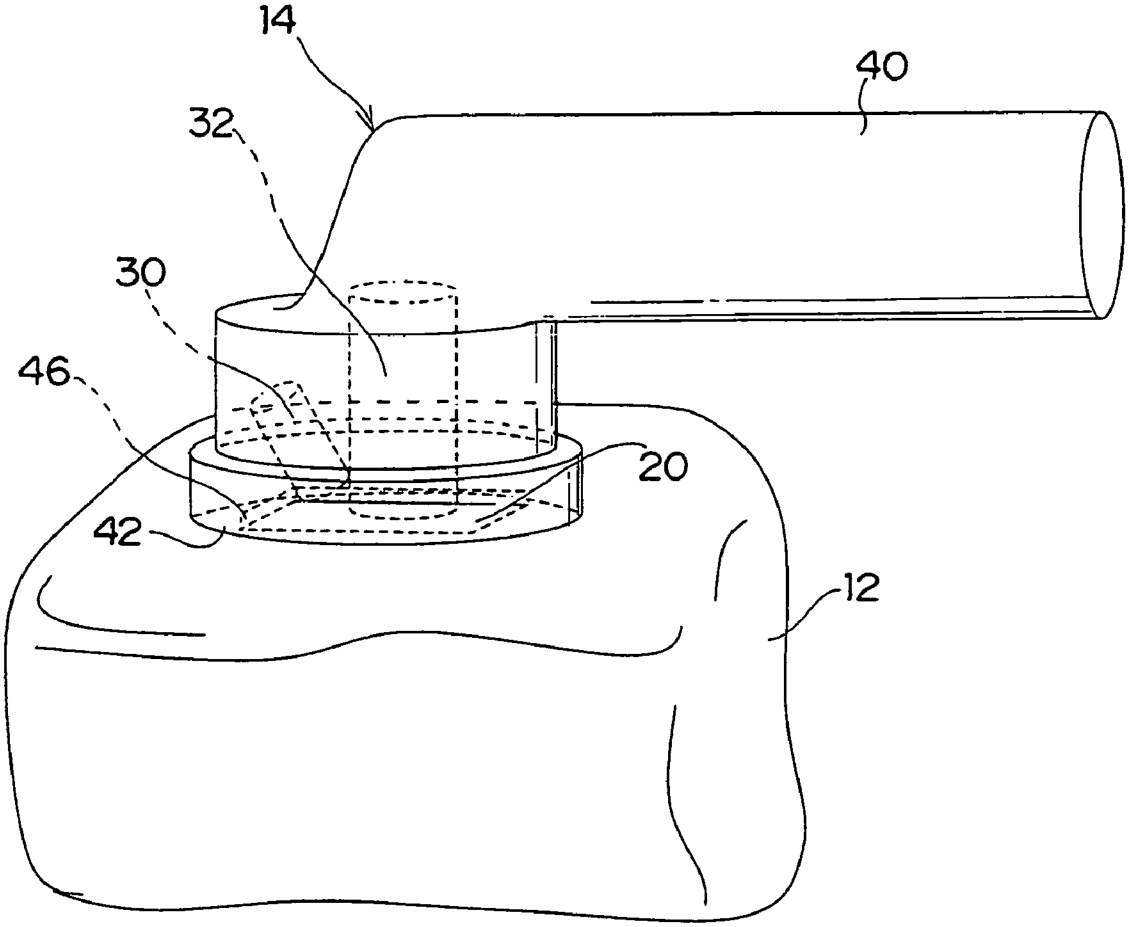
FIG. 15 is an appearance view showing one example of a reading unit of the article confirming device.

FIG. 15 shows one example of the reading unit 14. In FIG. 15, the reading unit 14 is formed into a substantially L shape, and the long side is a handle portion 40 gripped by an operator and the illumination section 30 and the light receiving section 32 are embedded in the shorter side so that an end surface thereof is a reading surface 42. The operator grips the handle portion 40 and presses the reading surface 42 against the portion to which the protection material 20 is affixed so as to bring the reading surface 42 into contact with the surface of the article 12. Pressing the reading surface 42 in this manner allows the entire reading unit 14 to come into a state closed optically, so that the random pattern of the article 12 can be read without being affected by ambient light.

Figure 16:
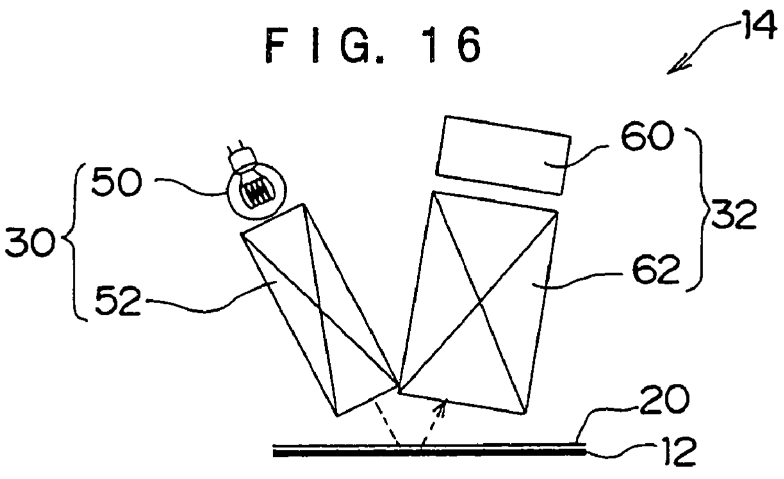
FIG. 16 is a detailed configuration view of the reading unit.

The illumination section 30, as shown in FIG. 16, includes a light source 50 that outputs light and an optical waveguide optical system 52 that guides light outputted from the light source 50 toward the reading surface 42 and with the illumination light, irradiates the protection material 20 on the surface of the article 12 with which the relevant reading surface 42 is brought into contact. For the light source 50, for example, an LED, a halogen lamp, a fluorescent lamp, a xenon discharge lamp or the like can be used. In place of the optical waveguide optical system 52, a collective lens that collects light on the surface of the article 12 can also be used. Furthermore, a light-shielding plate may be provided, not to be affected by surrounding light.

The light receiving section 32 includes an imaging element 60, a lens unit 62 that forms an image on a light receiving surface of the imaging element 60 from the reflected light of the illumination light emitted by the illumination section 30 and transmitted through the protection material 20, that is, coming from the article 12. For the imaging element 60, a CMOS or a CCD can be used and the random pattern of the article 12 can be acquired as gradation information.

Here, the individual difference of the gradation information obtained from the random pattern of the article 12 is generally considered to be clearer as the observation region S of the random pattern is wider, because more information is obtained from the wider observation region.

The article is generally required to be homogenous at the raw material stage, and thus if the observation region S is too wide, the uniformity occupying the information becomes large, which makes it difficult to extract characteristics by which the individual article is effectively discriminated. Furthermore, when the observation region S becomes wider, the reading unit 14 grows in size, which is disadvantageous in terms of installation area and costs. Accordingly, in terms of the random pattern on which attention is focused, and costs and size of the reading unit 14 composed of the illumination section 30, the receiving section 32 and the like, an area of the observation region S which makes the individual differences of as many articles 12 as possible clear should be determined.

In these terms, specifically, it has been confirmed by the present applicant that as the observation region S, it is proper that an area on the surface of the article 12 is 0.1 to 1000 $mm^2$. If a region of, for example, 6.3 mm by 5.0 mm in this range is the observation region S, a value about 50 $mm^2$ is enough for an area of the protection material 20 surface which is illuminated by the optical waveguide optical system 52 of the illumination section 32.

In this case, for example, if an image of the observation region S of 6.3 mm×5.0 mm is formed in a full effective pixel region by the lens unit 62, using a CCD of square lattice with effective pixels of 1300×1030 (about 1,300,000 pixels), in black and white as the imaging element 60, the observation area per pixel at this time is about 4.9 μm×4.9 μm (6.3 mm/1300=4.9 μm, 5.0 mm/1030=4.9 μm). As described above, the size (period) of the random pattern to be observed is of micrometer order, that is, about several to several hundreds μm, and thus, in this case, the state of the pattern can be sufficiently observed. Furthermore, if the CCD used as the imaging element 60 is, for example, of 2/3 type and has a pixel size of 6.7 μm×6.7 μm (square lattice) (CCD effective screen size: 8.7 mm×6.9 mm), the magnification by the lens unit 62 (hereinafter, magnification of the optical system) in this case is 1.38 times (lateral magnification: 8.7/6.3=1.38, longitudinal magnification: 6.9/5.0=1.38).

Furthermore, for example, if an image of the observation region S of 7.7 mm×5.7 mm is formed in the entire effective pixel region by the lens unit 62, using a CCD with effective pixels of 640×480 (about 300,000 pixels) in black and white as the imaging element 60, the observation area per pixel at this time is about 12 μm×12 μm (7.7 mm/640=12 μm, 5.7 mm/480=12 μm). Namely, in this case, the approximate state of the random pattern can also be observed. Furthermore, if the CCD used as the imaging element 60 is, for example, of 1/3 type and has a pixel size of 8.4 μm×8.3 μm (square lattice) (CCD effective screen size: 5.4 mm×4.0 mm), the magnification of the optical system in this case is advantageously designed to be 0.7 times (lateral magnification: 5.4/7.7=0.7, longitudinal magnification: 4.0/5.7=0.7).

Still further, for example, if an image of the observation region S of 7.3 mm×5.8 mm is formed in the full effective pixel region by the lens unit 62, using a CMOS with effective pixels of 367×291 (about 110,000 pixels), with an output signal of 8 bits (256 levels of gray), in black and white as the imaging element 60, the observation area per pixel at this time is about 20 μm×20 μm (7.3 mm/367=20 μm, 5.8 mm/291=20 μm). Also, in this case, the random pattern can be sufficiently observed. Furthermore, if the CMOS used as the imaging element 60 is, for example, of 1/7 type and has a pixel size of 5.6 μm×5.6 μm (square lattice) (CMOD effective screen size: 2.1 mm×1.6 mm), the magnification of the optical system in this case is advantageously designed to be 0.3 times (lateral magnification: 2.1/7.3=0.3, longitudinal magnification: 1.6/5.8=0.3).

The focal point of the lens unit 62 (optical system) is designed to be on the surface of the article 12 in order to avoid the influence of the flaws caused on the protection material 20, and it is desirable that focusing only on the random pattern portion of the article 12 is performed.

While FIGS. 15, 16 show an example of a light-reflecting type reading unit, the reading unit may be of a light-transmitting type if the article 12 has optical transparency, in which by receiving illumination light transmitted through the protection material 20 and the article 12, the random pattern may be acquired.

Detailed Configuration of Determination Unit

Next, the determination unit 18 is described in detail.

As shown in FIG. 11, the determination unit 18 includes a signal processing circuit 80 that applies predetermined processing to a signal indicating the reading result from the reading unit 14, a control circuit 82 that controls the drive of the signal processing circuit 80, a characteristic amount extracting section 84 that extracts from an output signal of the signal processing circuit 80 a characteristic amount of the irreproducible random pattern, a memory 86 that, as a storage device, stores the characteristic amount extracted by the characteristic amount extracting section 84, a comparison section 88 that, as a determination device, compares a characteristic amount extracted by the characteristic amount extracting section 84 with the characteristic amount registered in the memory 86 to determine the authenticity (genuine or imitation) of the article 12 based on a relevant comparison result, and a determination result signal outputting section 90 that outputs a signal indicating an authenticity determination result.

The signal processing circuit 80 is connected to the control circuit 82, the characteristic amount extracting section 84 and the light receiving section 32 of the reading unit 14. The control circuit 82 is connected to the switch 16 and the reading unit 14. Into the determination unit 18 is inputted a signal indicating on/off from the switch 16, and when there is inputted the signal indicating on from the switch 16, the determination unit 18 transmits a signal instructing the reading unit 14 to read and transmits a signal instructing the signal processing circuit 80 to start the measurement.

The signal processing circuit 80 receives the measurement start instruction from the control circuit 82 and receives a light-receiving result by the light receiving section 32, that is, signal of the gradation information as a reading result of the random pattern within the observation region S by the reading unit 14. The signal processing circuit 80 applies predetermined signal processing such as amplification to this received signal, and then outputs the result to the characteristic amount extracting section 84. Namely, into the characteristic amount extracting section is inputted image data indicating the reading result of the random pattern of the article 12 by the reading unit 14.

The characteristic amount extracting section 84 performs the characteristic extraction of the random pattern that the article 12 possesses from the inputted image data. For the characteristic extraction, heretofore known techniques can be employed, and one example thereof is shown below.

The reading result of the random pattern by the reading unit 14 is divided into meshes each having a proper size (the number of meshes d=longitudinal M×traversal N), separation (quantization), a density value (density level q) represents each of the meshes (sampling), so that the random pattern is converted to a mosaic image. After the quantization and the sampling in this manner, if a density of the j-th mesh is $x_j$, this pattern can be described by a vector of $x=(x_1, x_2, \ldots x_d)^t$ (t indicates transposition). This vector is referred to as a characteristic vector. Each element of the vector provides a density of a corresponding image area. The obtained pattern is represented as one point on a characteristic space formed by the characteristic vector. As described above, since the individual article has a microscopically different random pattern, each characteristic vector represents unique characteristics. Namely, the characteristics of the random pattern of the individual article can be represented by this characteristic vector.

Figure 17A:
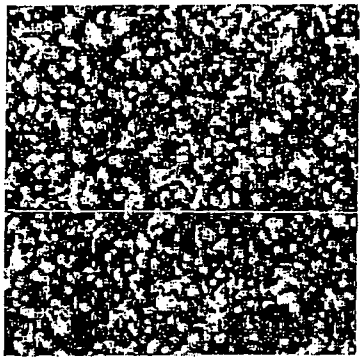
FIG. 17A is a view of an image showing a reading result of a random pattern from an article having the coated surface with metallic threads shown in FIG. 6.
Figure 17B:
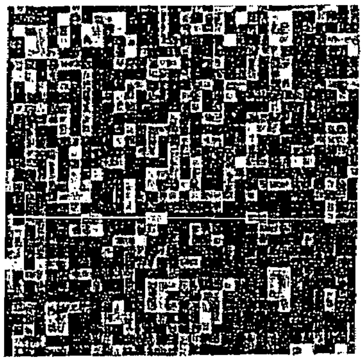
FIG. 17B is a view of an example of an image showing a result obtained by quantizing and sampling the image of 17A.
Figure 18:
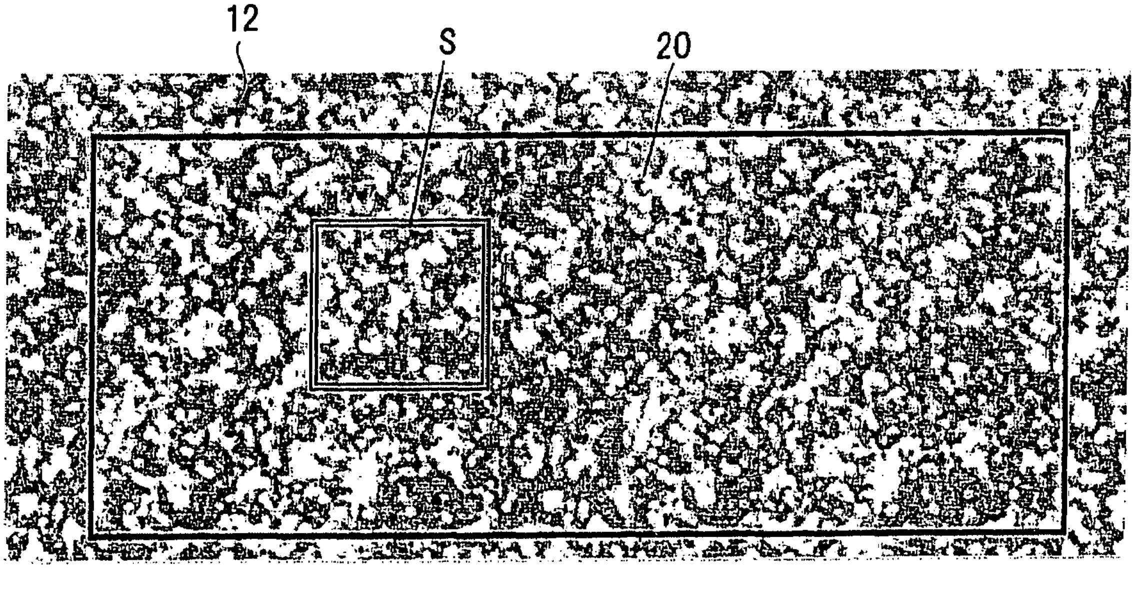
FIG. 18 is a view showing an example of a protection material and an observation region in the article of FIG. 17.

Specifically, in FIG. 17, an original image of an article surface of 1.0×1.0 mm and an example subjected to quantization and sampling with d=32×32 (M=N) and q=255. In FIG. 17, the article 12 is a resin product coated with the UV-cured coating material with metal micro-particles dispersed as shown in FIG. 6, and there are shown an image (A) of a reading result of the random pattern when a transparent film of 5×2 mm is stuck to the surface of this article 12 as the protection material 20 as shown in FIG. 18, and an image (B) of its quantization and sampling result. The thickness of the protection layer 20A of the transparent film is, for example, 120 μm and the thickness of the adhesive layer 20B is, for example, 35 μm. Furthermore, the region surrounded by a solid line is the observation region S of the random pattern.

Furthermore, the characteristic amount extracting section 84 is connected to the memory 86 and the comparison section 88. The characteristic amount extracting section 84, at the registration time, stores information indicating the obtained characteristic vector in the memory 86 as the characteristics of the random pattern of the genuine article 12. The characteristic amount extracting section 84, instead of the characteristic vector, may obtain a variance-covariance matrix or a correlation matrix from all vectors and store it in the memory 86. Hereinafter, the information indicating the characteristic vector stored in the memory 86 (or variance-covariance matrix or correlation matrix) is referred to as "first characteristic information". This first characteristic information corresponds to characteristic information indicating fine characteristics read from the genuine article according to the invention.

Furthermore, the characteristic amount extracting section 84, at the confirmation time, outputs information indicating an obtained characteristic vector (or variance-covariance matrix or correlation matrix) to the comparison section 88 as second characteristic information. Hereinafter, the information indicating the characteristic vector (or variance-covariance matrix or correlation matrix) outputted from the characteristic amount extracting section 84 to the comparison section 88 is referred to as "second characteristic information". This second characteristic information indicates fine characteristics read from the article to be confirmed according to the invention.

The comparison section 88 is connected to the memory 86, and can arbitrarily read the registration information of the memory 86. The comparison section 88 compares the second characteristic information inputted from the characteristic amount extracting 84 with all pieces of the first characteristic information registered in the memory 86, and the authenticity of the article 12 is determined in accordance with the degree of similarity.

More particularly, since the first characteristic information and the second characteristic information indicate characteristic vectors in the same characteristic space, the degree of similarity can be obtained by calculating a distance between the characteristic vector that the first characteristic information indicates and the characteristic vector that the second characteristic information indicates. As the distance becomes shorter, the degree of similarity becomes high (both are similar). Naturally, the distance may be obtained by performing dimension reduction of the characteristic space by KL (Karhunen-Loeve) expansion or the like.

In the comparison section 88, the distances between the all pieces of the first characteristic information and the second characteristic information are obtained, and it is determined that the article 12 to be confirmed is the genuine article 12 corresponding to the first characteristic information with the closest distance. When the distance is farther than a predetermined threshold value, it is determined that there is no applicable article for the genuine article 12, that is, that the article 12 to be confirmed is forgery.

Here, as the distance calculated as the degree of similarity, a distance used in determination analysis and cluster analysis on statistics, for example, Cityblock Distance, Euclidean Distance, Standardized Euclidean Distance, Minkowsky Distance, Mahalanobis Distance or the like can be used (MURAKAMI, Masakatsu: Behavior Metrics Series, "Science of Authenticity", Asakura Shoten, 1996). Any of the former four distances is obtained as a distance between the characteristic vector of the article to be confirmed and the characteristic vector of the registered genuine article 12. Mahalanobis Distance is calculated from the characteristic vector (average vector) of the article 12 to be confirmed and the characteristic vector (average vector) of the registered genuine article 12 and an inverse matrix of the characteristic matrix (variance-covariance matrix or correlation matrix).

Regarding the embodiment, the authenticity of the article 12 is determined by the distance, it may be determined by an angle formed by the characteristic vectors of both of the first and second characteristic information. Furthermore, while in the embodiment, the images indicated by the image data acquired in the reading unit 14 are compared on the real space to determine the authenticity, the invention is not limited to this. For example, the images indicated by the obtained image data may be transformed to a frequency region by two-dimensional Fourier transformation and be compared on the Fourier space. In this case, the image obtained from the genuine article 12 registered in advance and the image obtained from the article 12 to be confirmed are synthesized on the Fourier space and are subjected to inverse Fourier transformation to thereby obtain a correlation intensity image, and based on a peak value thereof, the degree of similarity between the two images can be evaluated. For example, when the magnitude of the peak of amplitude is a predetermined threshold or higher, they are an identical image, that is, the article to be confirmed is judged to be identical to the registered genuine article 12.

Furthermore, the comparison section 88 is also connected to the determination result signal outputting section 90. The comparison section 88 outputs to the determination result signal outputting section 90 a signal indicating the authenticity determination result of the article 12 to be confirmed which has been determined by comparing the first characteristic information and the second characteristic information. The determination result signal outputting section 90 is connected to a device at a latter stage and in order to control the operation of the device at the latter stage, it outputs the signal indicating the authenticity determination result to the device at the latter stage. For example, upon receiving the output signal from the determination result signal outputting section 90, the determination result may be displayed on display means such as a liquid crystal display, or the predetermined processing start or processing prohibition or the like in the device at the latter stage may be controlled.

Example of Method for Specifying Observation Region S

In the article confirming device 10 according to the embodiment, for the identical article 12, the random pattern of the identical observation region S needs to be observed at the registration time and at the confirmation time described later. Namely, the identical observation region S needs to be always specified from the identical article 12.

This alignment can be performed by scanning the entire region covered by the protection material 20 of the transparent film or the like to read the random pattern and comparing the random pattern with the registered information at the comparison time in the comparison section 88. For the observation region S, a minute region of 0.1 to 1000 mm$^2$ is enough as described above, and thus, scanning the entire region covered by the protection material 20 is not efficient. The simplest manner to specify the observation region S is to measure a distance from a physical border such as an edge of the article.

Therefore, in the embodiment, as shown in FIG. 15, in the reading surface 42, there is provided an abutting portion 46 for positioning the article 12 by forming a rectangular concaved portion.

When the reading surface 42 of the reading unit 14 is brought into contact with the article 12, an outer edge of the protection material 20 affixed to the relevant article 12 is made to abut on the abutting portion 46, by which the position of the article 12 with respect to the illumination section 30 and the light receiving section 32 is constantly set at the same position. Thereby, the article 12 can be positioned by the abutting portion 46 so that the portion including the observation region S covered by the protection material 20 corresponds to the reading position of the reading unit 14. The positioning of the article 12 by the abutting portion 46 easily enables the specification of the observation region S on the surface of the article 12.

FIG. 15 is an example on the premise that the protection material 20 is formed into a rectangular film, and it goes without saying that the shape of the abutting portion 46, the number, the setting position thereof, and the like are selected as necessary in accordance with the shape of the protection material 20.

Furthermore, while in the embodiment, the case where the positioning of the article 12 is manually performed when the operator grips the handle portion 40 and brings the reading surface 42 into contact with the article 12 is described, the positioning may be automatically performed.

Thus, while in the embodiment, the article 12 is positioned by the abutting portion 46 to thereby specify the observation region S, the invention does not limit the method for specifying the observation region S to this. As another method, there is a method of making a mark for detecting the position on the protection material 20 of the transparent film or the like. In particular, since the method of positioning the article 12 by the abutting portion 46 is easily affected by deformation of the article, in the case of the article 12 of a soft material such as leather and fabric, the method of making the mark for detecting position on the protection material 20 of the transparent film or the like is preferable.

Figure 19:
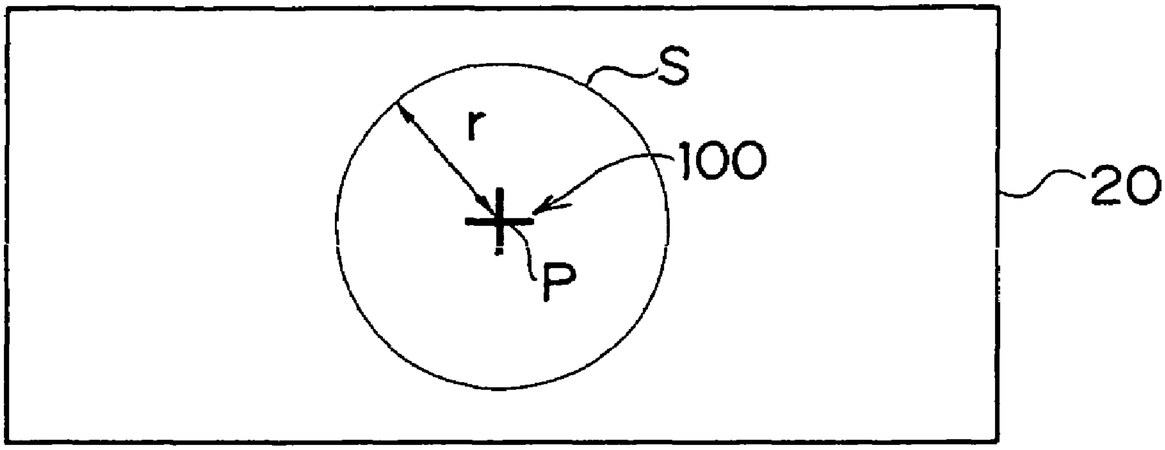
FIG. 19 is a view showing an example in which a mark for detecting a position is made on a protection material.

FIG. 19 shows one example of the case where the mark for detecting position is made. As shown in FIG. 19, if a mark 100 of "+" has been printed on the surface of the protection material 20 on the article 12, the observation region S can be specified with this mark 100 used as a clue. In this case, the inside of a circle with radius r centering about an intersection P of the mark 100 of "+" is advantageously decided as the observation region S. Also, in this case, it is desirable to specify a rough position by the abutting portion 46 or the like. Image data indicating an image with a size of L×L including the mark of "+" with a size of M×M (L>M) is acquired in a range of the rough position by the imaging element 60 of the light receiving section 32, using a lens system with a wide viewing angle (view angle) (prepared aside from the lens unit 62 of the light receiving section 32), and a position to which the "+" mark 100 of M×M corresponds on this image of L×L is advantageously searched using a technique such as a correlation method or a residual sequential test method. The processing performed at this time is also matching processing, which allows the observation region S to be easily specified with far less information amount as compared with the random pattern information that the article 12 possesses.

Operation of Article Confirming Device

Figure 20:
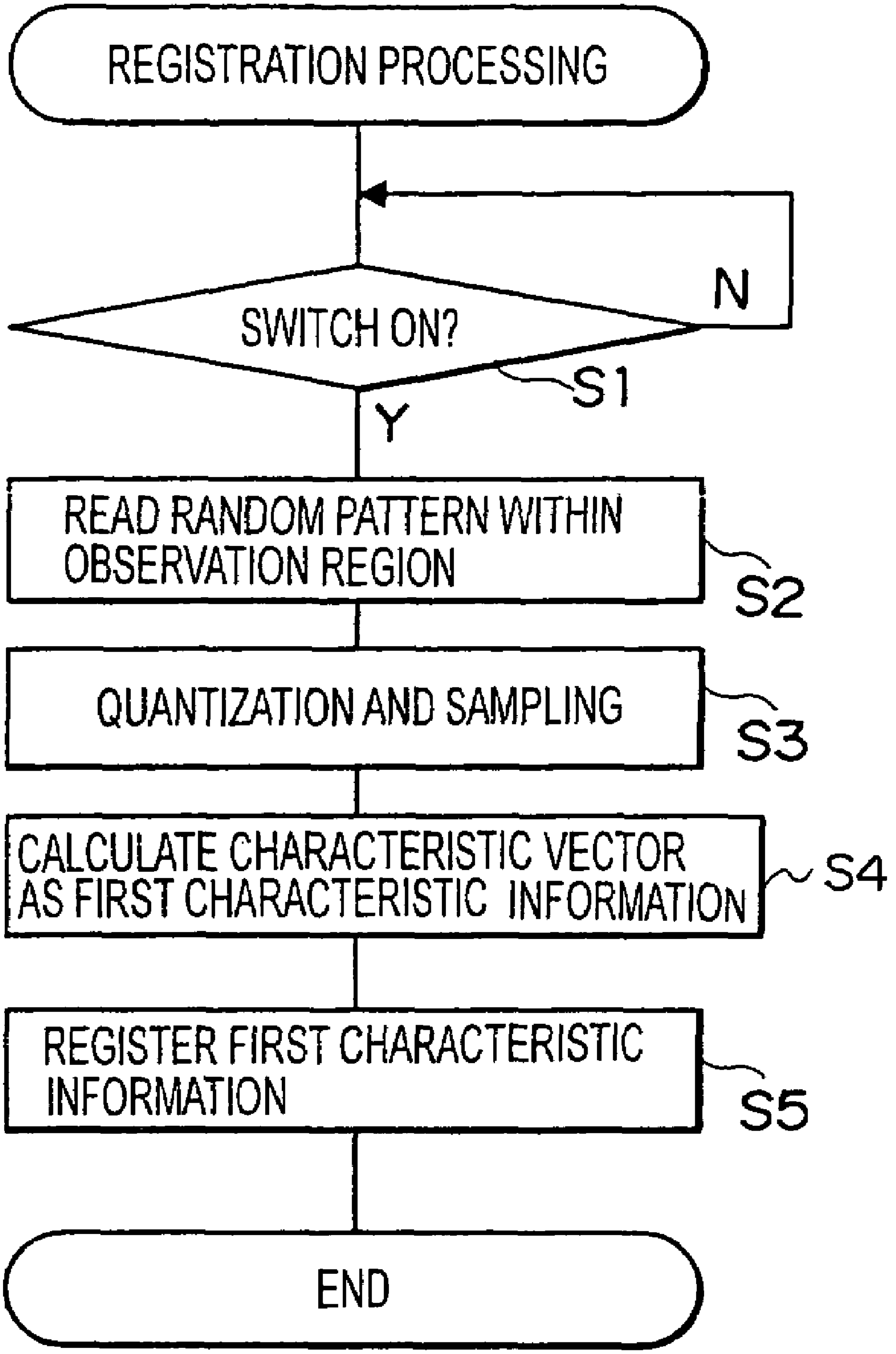
FIG. 20 is a flowchart showing registration processing performed in the article confirming device according to the first embodiment.

Next, as an action of the embodiment, the operation of the article confirming device 10 is described. In the article confirming device 10, the characteristics of the random pattern that the genuine article 12 possesses need to be registered in advance in order to determine the authenticity of the article 12. FIG. 20 shows registration processing executed in the article confirming device 10 for this.

When registering the characteristics of the random pattern, the operator grips the handle portion 40, and brings the reading surface 40A into contact with the article 12 to be registered (genuine) by pressing and makes the peripheral portion of the protection material 20 affixed to the relevant article 12 abut on the abutting portion 46, by which the switch 16 is turned on in a state in which the relevant article 12 has been positioned.

As shown in FIG. 20, when the switch 16 is turned on, the article confirming device 10 goes from step S1 to step S2, and reads the random pattern within the observation region S from the article 12 to be registered (genuine) by the reading unit 14.

More particularly, an reading instruction is sent out from the control circuit 82 to the reading unit 14 to make the reading unit 14 read the random pattern within the observation region S, the signal indicating the relevant reading result is received in the signal processing circuit 80, and the predetermined signal processing is applied to thereby obtain the image data indicating the random pattern within the observation region S. Since the peripheral portion of the protection material 20 is made to abut on the abutting portion 46 to position the article 12, the observation region S can be easily specified by the distance from the edge of the protection material 20.

At next step S3, the image data indicating the random pattern within the observation region S is quantized and sampled at predetermined steps by the characteristic amount extracting section 84 to be converted to a mosaic image, and the processing goes to step S4, when the characteristic vector (or variance-covariance matrix or correlation matrix) is calculated from the image data after quantization and sampling.

Finally, at step S5, the data indicating the calculated characteristic vector (or variance-covariance matrix or correlation matrix) is stored in the memory 86 as the first characteristic information and the registration processing in FIG. 16 is finished. Thereby, the characteristics of the random pattern of the genuine article 12 are registered in the memory 86 as the first characteristic information.

Figure 21:
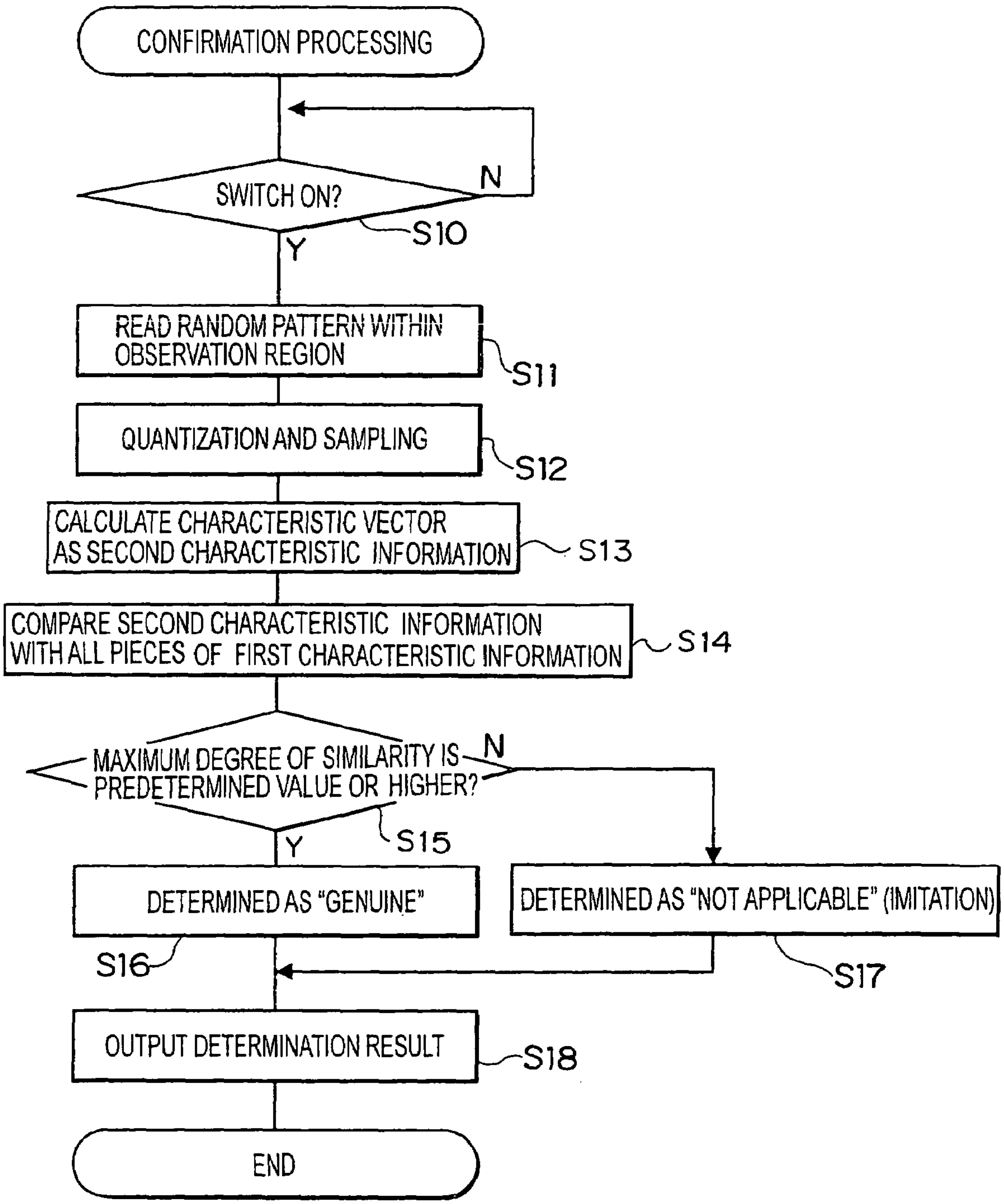
FIG. 21 is a flowchart showing confirmation processing performed in the article confirming device according to the first embodiment.

Next, a case where the authenticity of the article 12 to be confirmed is confirmed is described. FIG. 21 shows confirmation processing of the article 12, which is executed in the article confirming device 10 for this.

When confirming the article 12, the operator also grips the handle portion 40 and brings the reading surface 40A into contact with the article 12 to be confirmed by pressing, and makes the peripheral portion of the protection material 20 affixed to the relevant article 12 abut on the abutting portion 46, by which the switch 16 is turned on in a state in which the relevant article 12 has been positioned.

As shown in FIG. 21, when the switch 16 is turned on, the article confirming device 10 goes from step S10 to step S11, and reads the random pattern within the observation region S from the article 12 to be confirmed by the reading unit 14.

At next step S12, the image data indicating the resultant random pattern within the observation region S is quantized and sampled at predetermined steps to be converted to a mosaic image, and at next step S13, the characteristic vector is calculated as the second characteristic information. Since the processing from step S11 to step S13 is similar to that of the registration processing (step S2 to step S4 in FIG. 20), its detailed description is omitted.

At next step S14, the comparison section 88 reads all pieces of the first characteristic information registered in the memory 86 in order, and compares each piece of the read first characteristic information with the above-described second characteristic information obtained at step S13. As a result of this comparison, when the maximum value of the degree of similarity between both is a predetermined threshold value or higher, the processing goes from step S15 to step S16 and it is determined that the article 12 to be confirmed is "genuine", otherwise, the processing goes from steps 15 to step S17, and it is determined that the article 12 is "imitation".

Namely, the degrees of similarity between the second characteristic information and all pieces of the first characteristic information are obtained and basically, it is determined that the article 12 corresponding to the first characteristic information, which has the highest degree of similarity is "genuine". Even if the degree of similarity is higher, when the degree of similarity is lower than the threshold value set in advance, it is determined that the article 12 is "imitation".

The threshold value used at this time is preferably set with a predetermined acceptable range in prospect of errors of the first and second characteristic information (reading errors by the reading unit 14, quantization and sampling errors and the like). Namely, the threshold value is advantageously selected as necessary in accordance with the requirement of whether the authenticity determination is strict or lenient. Furthermore, the acceptable range is different, depending on the type of the article 12, that is, in some cases, the threshold value varies in each article 12, and thus, when the first characteristic information of the genuine article 12 is registered, an appropriate threshold value for the relevant article 12 is registered in the memory 86 in association with the first characteristic information, and at the confirmation time, the authenticity is advantageously determined using the threshold value associated with each piece of the first characteristic information.

Furthermore, since there may occur an accident such as some operation mistake or displacement at the matching time, final determination may be made from a plurality of determination results, or retrials may be admitted up to a predetermined times when the comparison result does not show the genuine article.

Finally, at step S18, the signal indicating the determination result of "genuine" or "imitation" is outputted from the determination result signal outputting section 90 and the confirmation processing of FIG. 21 is finished.

Thus, while in the first embodiment, the case where the second characteristic information obtained from the article 12 to be confirmed is compared with all pieces of the registered first characteristic information (so-called identification) is shown, the invention is not limited to this. Identification code may be used to select the corresponding first characteristic information, so that the second characteristic information may be compared with only one piece of the first characteristic information (so-called matching). In particular, when the number of registrations of the first characteristic information becomes large, comparing the second characteristic information with all pieces of the first characteristic information as described above, requires long time for confirmation processing of the article 12, and thus, it is preferable to use the identification code.

Second Embodiment

Hereinafter, as a second embodiment, the case where the identification code is used is described. Hereinafter, the same reference numbers and signs are given to the same members as those of the first embodiment, and only different parts from the first embodiment are described in detail.

Figure 22A:
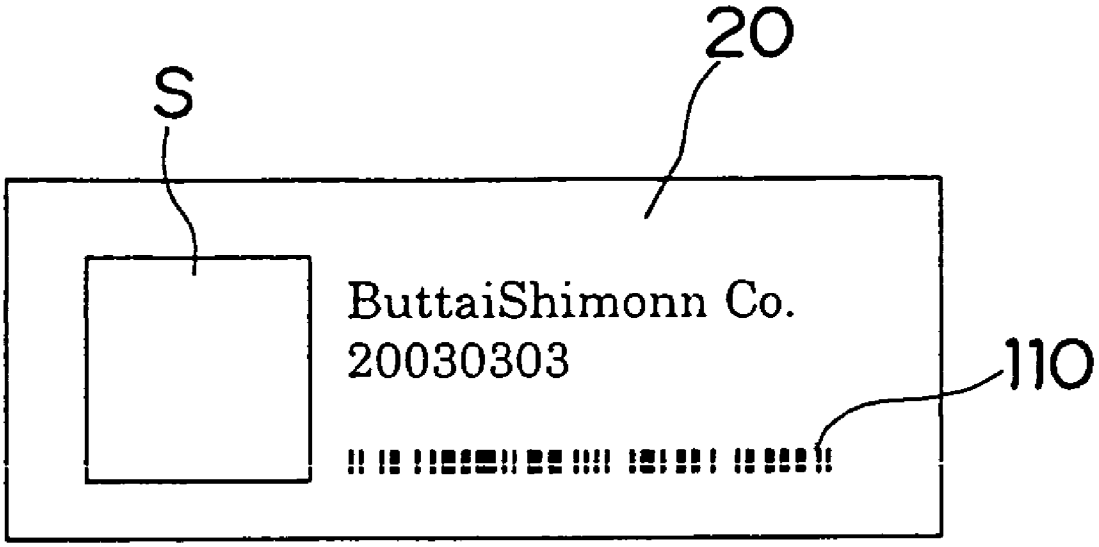
FIGS. 22A and 22B are views each showing one example of a protection material affixed (to be affixed) to an article according to a second embodiment.
Figure 22B:
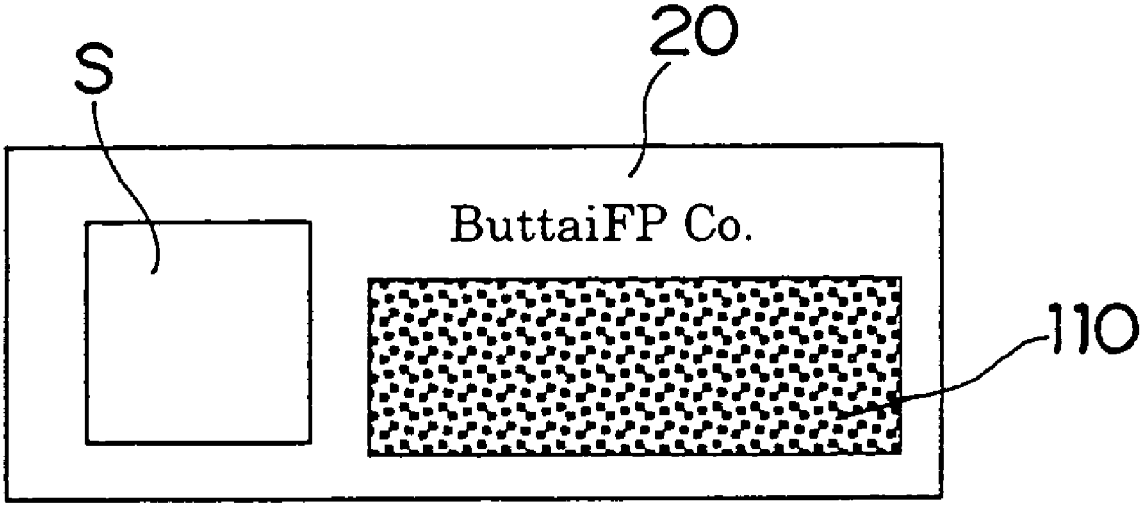

In the second embodiment, as shown in FIG. 22, identification code 110 for identifying the article 12 is recorded in advance at a portion which is on the surface of the protection material 20 affixed (or to be affixed) to the relevant article 12 and is different from the observation region S where the random pattern is observed. The identification code may be recorded on the article 12. This identification code 110 may be a string of characters and numeric characters or may be barcode, or may be a special coded sign. FIG. 22A shows an example in which barcode indicating the identification code 110 is recorded, and FIG. 22B shows an example in which the identification code 110 is converted to two-dimensional barcode.

Figure 23:
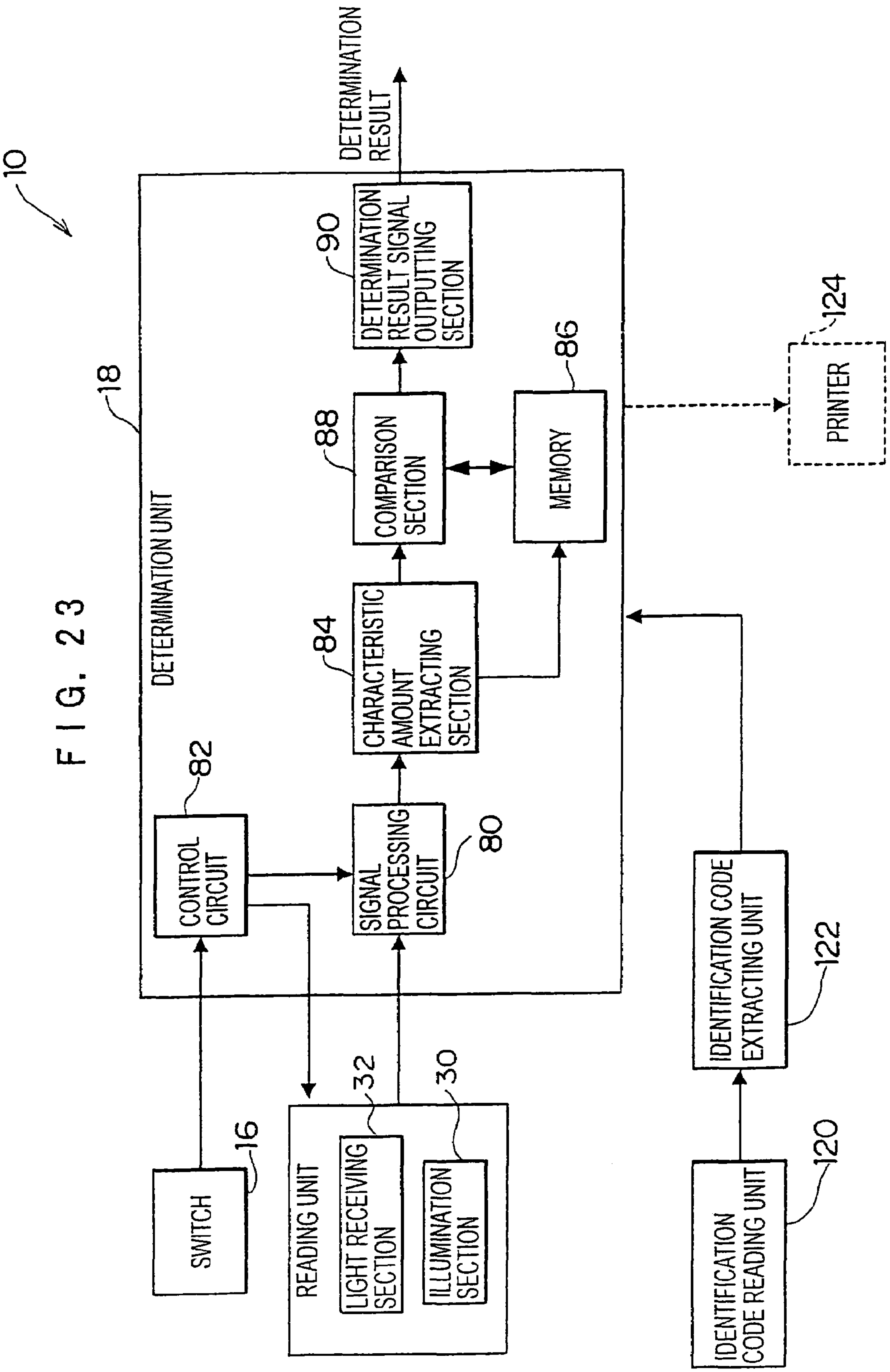
FIG. 23 is a block diagram showing a schematic configuration of an article confirming device according to the second embodiment.

In FIG. 23, a schematic configuration diagram of an article confirming device according to the second embodiment. In FIG. 23, the same reference numerals are given to the same members as those of FIG. 11, and hereinafter their detailed description is omitted.

As shown in FIG. 23, the article confirming device 10 according to the second embodiment is different from that of first embodiment in that as an identification code reading device, there are further provided an identification code reading unit 120 for reading the identification code 110, and an identification code extracting unit 122 that extracts the identification code from a reading result by the identification code reading unit 120. Since the identification code reading unit 120 can have a configuration similar to that of the reading unit 14, a description of the detailed configuration is omitted. Furthermore, it goes without saying that this identification code reading unit 120 is provided at a position capable of reading the identification code 110 from the protection material 20 on the article 12. Furthermore, it is preferable that the focal point of a lens unit (optical system) of the reading unit 14, whose pathway is not shown in the figure, is designed to be located on the surface of the protection material 20.

The identification code reading unit 120 is connected to the identification code extracting unit 122, and image data indicating the reading result by the identification code reading unit 120 is inputted to the identification code extracting unit 122. The identification code extracting unit 122 extracts the identification code by reading the inputted image data and applying decode processing. The identification code extracting unit 122 is connected to the determination unit 18, and the determination unit 18 is notified of the identification code extracted by the identification code extracting unit 122.

In the determination unit 18, at the registration time, in the characteristic amount extracting section 84, the first characteristic information is registered in the memory 86 in association with the notified identification code. Furthermore, in the determination unit 18, at the confirmation time, in the comparison section 88, the first characteristic information registered in the memory 86 in association with the notified identification code is read and then the read first characteristic information is compared with the second characteristic information, by which the authenticity of the article to be confirmed is advantageously determined in accordance with the degree of similarity between both.

Figure 24:
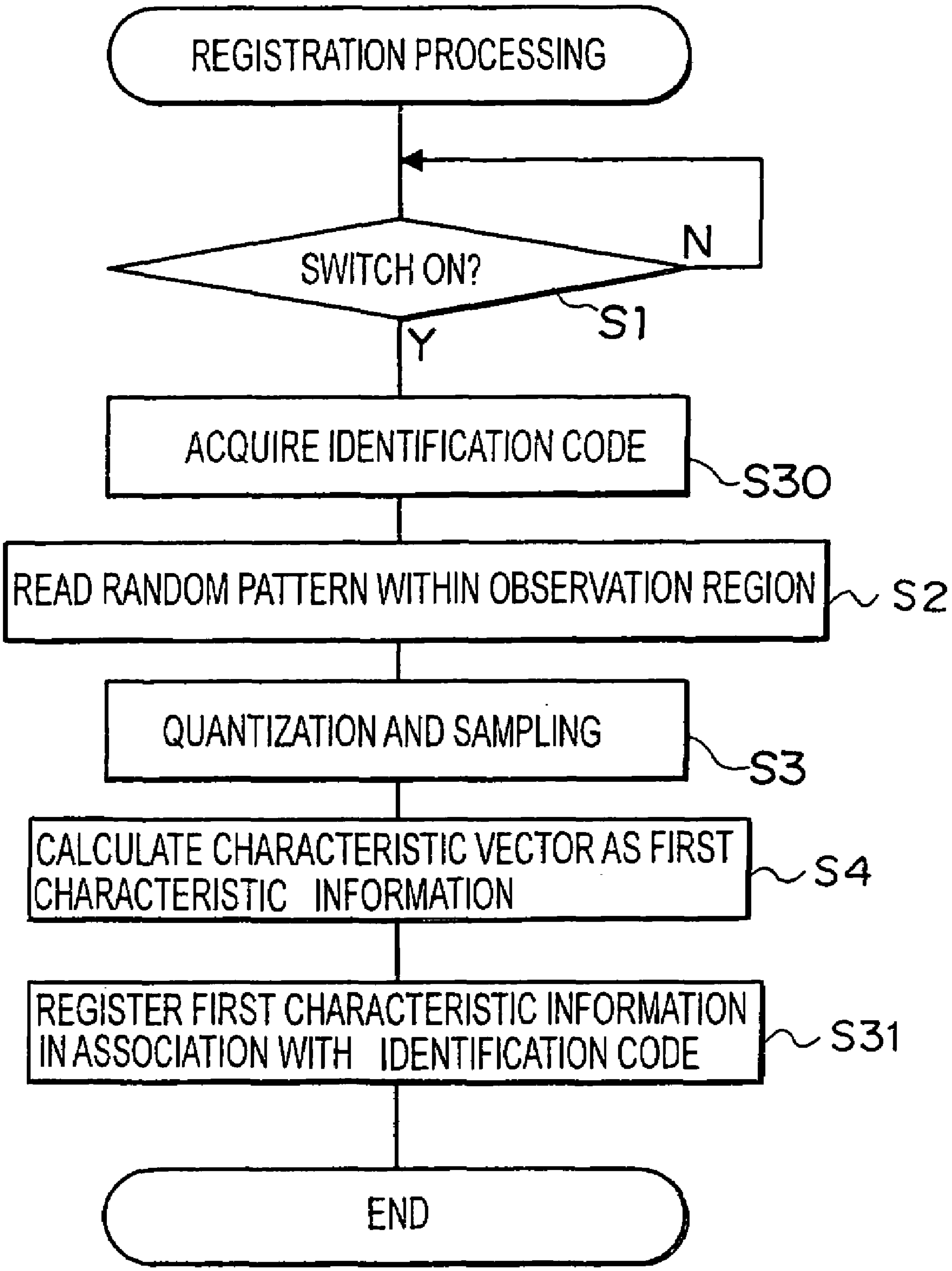
FIG. 24 is a flowchart showing registration processing performed in the article confirming device according to the second embodiment.

Next, the operation of the article confirming device 10 according to the second embodiment is described. In FIG. 24, registration processing performed in the article confirming device 10 according to the second embodiment is shown. In FIG. 24, the same step numbers are given to processing similar to that in FIG. 20 and the detailed description is omitted below.

As shown in FIG. 24, in the article confirming device 10, when the switch 16 is turned on, the processing goes from step S1 to step S30 to acquire the identification code of the article 12 to be registered (genuine). More particularly, the region on which the identification code is recorded is read from the protection material 20 on the article 12 by the identification code reading unit 120 to acquire the image data and the identification code is extracted from this image data by the identification code extracting unit 122.

In the article confirming device 10, subsequently, at step S2, similar to the first embodiment, the random pattern within the observation region S is read from the article 12 to be registered (genuine) by the reading unit 14, at next step S3, the image data indicating the resultant random pattern within the observation region S is quantized and sampled at the steps set in advance to be converted to a mosaic image, and at next step S4, a characteristic vector is calculated as the first characteristic information.

Finally, at the step S31, the first characteristic information obtained at step S4 is stored in the memory 86 in association with the identification code acquired at step S30, and the registration processing in FIG. 24 is finished. Thereby, the identification code is registered in the memory 86 together with the first characteristic information.

Figure 25:
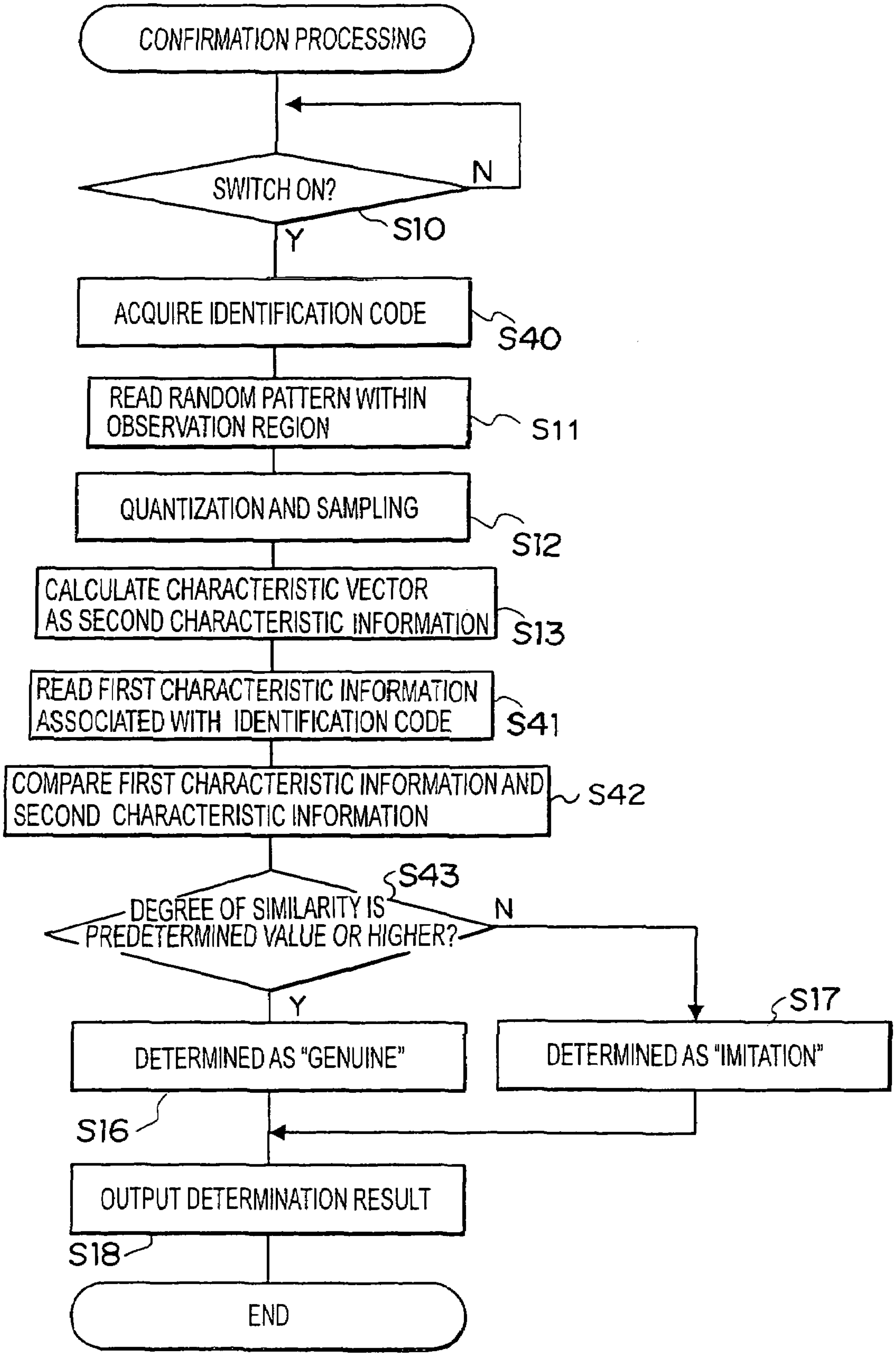
FIG. 25 is a flowchart showing confirmation processing performed in the article confirming device according to the second embodiment.

Next, in FIG. 25, the confirmation processing performed in the article confirming device 10 according to the second embodiment is shown. In FIG. 25, the same step numbers are given to processing similar to that of FIG. 21, and a detailed description is omitted below.

As shown in FIG. 25, in the article confirming device 10, when the switch 16 is turned on, the processing goes from step S10 to step S40 to acquire the identification code from the article 12 to be confirmed as in step S30 of FIG. 24, and then goes to step S11. At step S11, the random pattern within the observation region S is read from the article 12 to be confirmed by the reading unit 14, and at next step S12, image data indicating the resultant random pattern within the observation region S is quantized and sampled at the steps set in advance to be converted to a mosaic image, and at next step S13, a characteristic vector is calculated as the second characteristic information.

The processing goes to step S41, when the comparison section 88 reads, from the memory 86, the first characteristic information associated with the identification code acquired at step S40, and at next step S42, compares this read first characteristic information with the second characteristic information obtained at step S13. As a result of this comparison, when the degree of similarity between both is a predetermined threshold value or higher, the processing goes from step S43 to step S16 and it is determined that the article 12 to be confirmed is "genuine", otherwise, the processing goes from step S43 to step S17, and it is determined that the article 12 is "imitation".

As in the first embodiment, the threshold value used at this time is preferably set with a predetermined acceptable range, and is advantageously selected as necessary in accordance with the requirement of whether the authenticity determination is strict or lenient. Furthermore, in the case where the acceptable range is different, depending on the type of the article 12, at the registration time of the first characteristic information, the threshold value is advantageously registered in the memory 86 together with the identification code. Furthermore, final determination may be made from a plurality of determination results, or retrials may be admitted up to a predetermined times when it is determined that the article 12 is "imitation".

Finally, at step S18, a signal indicating the determination result of "genuine" or "imitation" is outputted and the confirmation processing in FIG. 25 is finished.

While in the second embodiment, the identification code is acquired by the identification code reading unit 120 and the identification code extracting unit 122, the invention is not limited to this. For example, if the reading unit 14 bears the function of the identification code reading device and the reading unit so as to be capable of reading the identification code, the identification code reading unit 120 can be omitted. In this case, as described above, at the time of reading the random pattern, in order to avoid the influence of flaws caused on the surface of the protection material 20, it is preferable that the focal point of the lens unit 62 (optical system) is located on the surface of the article 12. In the case where the identification code is recorded on the surface of the protection material 20, it is preferable that the focal point is variable so as to be located on the surface of the protection material 20 at the time of reading the identification code. For such a purpose, a shallow optical system with a depth of field of about several tens to several hundreds μm is desirable.

Furthermore, since the operator can visually read the identification code 110 printed in a string, the operator may input the identification code from a keyboard or the like. In this case, the identification code reading unit 120 and the identification code extracting unit 122 can be omitted.

Other Embodiments

In the second embodiment, although the identification code 110 is used to associate the genuine article 12 with the first characteristic information, which is the characteristics of the random pattern of the relevant article, the genuine article 12 can associate with the characteristics of the random pattern of the relevant article without using the identification code 110. Namely, as another embodiment, the first characteristic information, which is the characteristics of the random pattern of the genuine article 12 may be recorded on the relevant genuine article 12.

More particularly, a printer 124 as a recording device is connected to the determination unit 18 of the article confirming device 10 as indicated by a line in FIG. 23, and the first characteristic information is encoded and the like to be printed on the surface of the relevant article 12 or on the surface of the protection material 20 of the relevant article 12 by this printer 124, which can associate the article 12 and the characteristics of the random pattern of the relevant article. Thus, in the case where the first characteristic information is recorded on the genuine article 12 itself, the first characteristic information is advantageously read from the surface of the relevant article 12 for matching by using the identification code reading unit 120 or the reading unit 14 as a characteristic information reading device. Also, in this case, the effect that the memory 86 can be omitted is also brought about.

Furthermore, as the first characteristic information, the image of the random pattern read from the genuine article 12 by the reading unit 14 may be recorded on the relevant article 12. In this case, at the confirmation time, the image of the random pattern is advantageously read to obtain a characteristic vector and match it to the second characteristic information.

Thus, in the article confirmation device 10, since the identification and the matching of the individual article 12 can be performed by utilizing the random pattern that the article 12 itself originally possesses, the confirmation of the article 12 can be realized with very ease and at low cost, as compared with the related art in which a sophisticated printing technique, and a foreign object other than the article 12, such as special ink, a forgery preventing sheet, a hologram, and an IC chip are used. Furthermore, since the random pattern, unlike information artificially generated, is an uncontrollable pattern that the article 12 possesses, the forgery is very difficult.

Furthermore, even if such a random pattern is forged in any method, the random pattern used for identification or matching is continuous quantity existing physically, and thus, the forgery can be prevented more securely without damaging the article, by methods such as instantly registering the random pattern at a higher resolution, changing the position (observation region S) on the article 12 where the random pattern is observed, and setting a plurality of positions.

Further, since the protection material 20 is affixed to the portion including at least the observation region S on the surface of the article 12 where the random pattern is observed and covers the relevant portion, the random pattern in the relevant portion can be protected and fixed, so that the random pattern can be read stably. Namely, since the observation region S on the surface of the article 12 is protected by the protection material 20, flaws and dirt are prevented, so that changes of the random pattern can be prevented. Even in the article that changes its shape, such as fabric products and leather products, the observation S on the surface of the article 12 is fixed by the protection material 20, so that the changes of the random pattern can be prevented. This allows high precision authenticity determination to be performed.

Still further, for the article 12, it is sufficient only to cover at least the portion of the observation region S on its surface by the protection material 20 to thereby protect and fix the random pattern of the relevant portion, and to record the identification code as necessary (only in the case where the matching is employed for confirmation processing), so that even the case where, after manufacturing the article, forgery prevention becomes necessary due to marketed forgery or the like can be addressed. Further, when the forgery prevention becomes unnecessary, the identification code recorded on the article 12 or the protection material 20 is marked out or the like so as to be unreadable, or the protection material 20 is peeled off from the article 12, which can disable the confirmation of the authenticity of the relevant article 12. Namely, the authenticity confirmation is enabled only when needed.

Yet further, while in the related art using a non-contact IC, there is a possibility that information is read from the non-contact IC without user's awareness, in the article confirming device 10, when the authenticity of the article 12 is confirmed, the reading unit 14 needs to be brought into contact with the article 12 for reading the minute random pattern from the article 12, and thus, the information for identifying or matching the relevant article 12 is prevented from being read surreptitiously without user's awareness, so that the article confirmation device 10 is more excellent than the conventional related art in terms of privacy protection.

While in the foregoing, the case where the random pattern originally existing in the article itself is protected and fixed by the protection material 20 such as a transparent film for use is described, there are articles whose random patterns are difficult to observe, such as resin whose surface is formed to be smooth, thereby having an uniform pattern, and metal or glass whose surface is subjected to mirror-grinding processing. For these articles whose random patterns are difficult to observe, the random pattern is advantageously formed by causing flaws by design.

For example, the random pattern can be provided by design by applying a machining process with a grinder or the like to a part of surface or by a chemical method such as etching. Although such flaws can be caused by design, it goes without saying that the pattern observed when the surface on which the flaws are caused is enlarged is an uncontrollable random pattern. FIGS. 7, 8 described above can be regarded as examples of the random pattern formed in this manner.

Furthermore, there are many articles whose random patterns are difficult to observe and to which flaws cannot be caused by design. In this case, instead of the article 12, a method of forming the random pattern on the side of the protection material 20 is effective.

For example, in the case where such a transparent film as shown in FIGS. 13, 14 is used as the protection material 20, the random pattern is formed in the protection layer 20A of the transparent film and its adhesive layer 20B as a pseudo solution to obtain the random pattern on the relevant article surface. More specifically, for example, indefinite-shape metal micro-particles with an average radius of about 15 μm are advantageously dispersed in the adhesive layer 20B. Since the micro-particles in the adhesive layer 20B are unstable until they are stuck onto the article 12, it is meaningless to steal the random pattern made by the micro-particles in advance. Furthermore, the random pattern by these micro-particles, which is made upon being stuck onto the article 12 collapses when the transparent film, that is, the protection material 20 is peeled off from the article 12. Thus, the random pattern cannot be reused.

Thus, the random pattern by the micro-particles at the point of being affixed to the article 12 by the adhesive layer 20B functions similarly to the random pattern that the article 12 originally possesses as described above.

For the micro-particles in this case, in addition to the metal micro-particles, resin powder, ceramic, glass or the like can be used. Instead of the micro-particles, pores may be employed. Regarding the shape, indefinite shape is more desirable than a spherical shape, because of high possibility that a pattern occurs randomly. Furthermore, considering that the reproduction of the random pattern is made more difficult, an average particle radius of several μm to several tens μm is preferable. The random pattern can also be formed by dispersing cellulose, or fibers of resin, metal, glass or the like in the adhesive layer. An average radius of the fibers of several μm to several tens μm and the length of several μm to several tens μm are preferable. Furthermore, there is a simple method of using a film with an adhesive layer in which crepe paper or flat paper is used as a support. In this case, a fiber pattern of the support, that is, the random pattern can be read before the film is stuck to the relevant article. As a result, two-dimensional code or the like in which an identification mark or characteristic information is described in advance can be printed on the film. Since the random pattern is fixed in advance, the film needs to be securely managed not to be used illegally.

In the case where the random pattern formed on the side of the protection material 20 is used instead of the article 12, the protection material 20 does not need to be transparent. The protection material 20 is preferably transparent in order to prevent the protection material 20 from being visually conspicuous on the article 12.

Furthermore, there is a possibility that defacement or flaws of the protection material 20 disables the random pattern to be read normally. To prevent this, it is advantageous that the protection material 20 is further covered by a transparent second protection material 130, as indicated by dashed line in FIG. 12B. In this case, it is preferable that the second protection material 130 has, for example, an adhesive layer with pressure-sensitive adhesiveness so that it can be easily peeled off from the protection material 20.

As mentioned above, an article confirmation method in which a forgery prevention effect is improved and the authenticity of the article can be confirmed with ease and high precision and its device are sought.

A first aspect of the invention is an article confirmation method for confirming the authenticity of an article. In this method, a protection material is affixed to a surface of a genuine article, irreproducible fine characteristics are read from a protection-material affixed portion of the genuine article, characteristic information indicating the read fine characteristics is stored, irreproducible fine characteristics are read from the protection-material affixed portion of an article to be confirmed, and the fine characteristics read are compared with the characteristic information, and the authenticity of the article to be confirmed is determined based on the comparison result.

According to the article confirmation method of the first aspect of the invention, the irreproducible fine characteristics that the genuine article possesses are read and the characteristic information indicating the relevant characteristics is stored in advance. When the authenticity of the article to be confirmed is confirmed, the irreproducible fine characteristics are similarly read from the relevant article to be confirmed and the read characteristics are compared with the characteristic information stored in advance, by which the authenticity of the relevant article to be confirmed can be determined. In this manner, by confirming the authenticity of the article utilizing the irreproducible fine characteristics that the article itself possesses, the confirmation of the article can be realized very easily and at low cost as compared with the related art in which a sophisticated printing technique and a foreign object other than the article, such as special ink, a forgery preventing sheet, a hologram, and an IC chip are used. Furthermore, since the irreproducible fine characteristics, unlike information generated artificially, are very difficult to forge, the forgery prevention effect is high.

Furthermore, since the protection material is in advance affixed to the portion where the irreproducible fine characteristics of the article are read, the irreproducible fine characteristics can be protected and fixed by the protection material. Namely, since the irreproducible fine characteristics can be stably read from the article, the high precision authenticity determination can be performed.

Further, for the article, since the protection material only needs to be affixed to the portion where the irreproducible fine characteristics are read, the case where, after manufacturing the article, forgery prevention becomes necessary due to the marked forgery can be addressed.

In the article confirmation method according to the invention, the fine characteristics read from the article to be confirmed may be compared with all pieces of the characteristic information recorded on the storage device. Namely, the authenticity of the article may be confirmed by identification. Furthermore, identification code for identifying the genuine article may be recorded on the surface of the relevant genuine article or the protection material affixed to the relevant genuine article, and when the characteristic information is stored, the relevant characteristic information may be stored in association with the identification code, the identification code may be read from the article to be confirmed or the protection material affixed to the article to be confirmed, and the fine characteristics read from the article to be confirmed may be compared with the characteristic information associated with the read identification code. Namely, the authenticity of the article may be confirmed by matching.

An article confirmation method of a second aspect of the invention is an article confirmation method for confirming the authenticity of an article. In this method, a protection material is affixed to a surface of a genuine article, irreproducible fine characteristics are read from a protection-material affixed portion of the genuine article, characteristic information indicating the fine characteristics read is recorded on the surface of the genuine article or the protection material affixed to the relevant genuine article, irreproducible fine characteristics are read from the protection-material affixed portion of an article to be confirmed, the characteristic information is read from the relevant article to be confirmed or the protection material affixed to the relevant article to be confirmed, the fine characteristics read are compared with the characteristic information, and the authenticity of the article to be confirmed is determined based on the comparison result.

According to this article confirmation method, the characteristic information indicating the irreproducible fine characteristics read from the genuine article is in advance recorded on the relevant article or the protection material affixed to the relevant article. Namely, the characteristic information is recorded on the article itself.

When the authenticity of the article to be confirmed, is confirmed, the irreproducible fine characteristics and the characteristic information are read from the relevant article to be confirmed, and both are compared to thereby determine the authenticity of the relevant article to be confirmed. Namely, by recording the characteristic information on the article itself, the confirmation of the article can be performed by matching without using the identification code.

Furthermore, in the above-described article confirmation method, in the case where the genuine article has the fine characteristics which are difficult to read, before affixing to the protection material, random flaws are advantageously given on the surface of the portion of the genuine article to which the protection material is affixed. The flaws in this case may be formed by scraping physically, or may be formed by scraping chemically.

Further, in the above-described article confirmation method, in the case where the genuine article has the fine characteristics, which are difficult to read, an irreproducible random pattern may be formed on the protection material in advance to substitute the relevant formed random pattern for the irreproducible fine characteristics of the article. The random pattern in this case can be formed, for example, by dispersing micro-particles or fibers in the protection material.

Furthermore, in the above-described article confirmation method, as the protection material, a transparent film in which a transparent adhesive layer is formed on the side of an affixing surface to the article can be used, and in this case, as described in claim 10, the adhesive layer is advantageously formed of an adhesive component that is fixed in a transparent state when a predetermined time has passed after being attached to the article. Further, as the protection material, thermoplastic resin that is transparent at ambient temperatures can also be used.

Still further, in the above-described confirming method, the surface of the protection material may be covered by a second protection layer that can be peeled off.

The article confirmation method of the first aspect of the invention can be realized by the following device. Namely, a third aspect of the invention is an article confirming device which confirms the authenticity of an article. The article confirming device advantageously comprises a reading device that reads irreproducible fine characteristics from a protection-material affixed portion of an article in which a protection material is affixed to a surface thereof, a storage device that, when the fine characteristics are read from the genuine article by the reading device, records characteristic information indicating the relevant read fine characteristics, a determination device that, when the fine characteristics are read from an article to be confirmed by the reading device, compares the relevant read fine characteristics with the characteristic information recorded on the storage device, and determines the authenticity of the relevant article to be confirmed based on the relevant comparison result.

In this article confirming device, the determination device may compare the fine characteristics read from the article to be confirmed with all pieces of the characteristic information recorded on the storage device.

Alternatively, identification code for identifying the genuine article may be recorded in advance on the surface of the relevant genuine article or the protection material affixed to the relevant genuine article, an identification-code reading device that reads the identification code may be further provided, the storage device may store the characteristic information in association with the identification code read by the identification code reading device from the genuine article or the protection material affixed to the relevant genuine article, and the determination device may compare the fine characteristics read from the protection-material affixed portion of the article to be confirmed with the characteristic information associated with the identification code read by the identification-code reading device from the relevant article to be confirmed or the protection material affixed to the relevant article to be confirmed.

Furthermore, the article confirmation method of the second aspect of the invention can be realized by the following device. Namely, a fourth aspect of the invention is an article confirming device which confirms the authenticity of an article. The article confirming device advantageously comprises a reading device that reads irreproducible fine characteristics from a protection-material affixed portion of an article in which a protection material is affixed to a surface thereof, a storage device that, when the fine characteristics are read from the genuine article by the reading device, records characteristic information indicating the relevant read fine characteristics on a surface of the relevant genuine article or the protection material affixed to the relevant genuine article, a characteristic information reading device that reads the characteristic information recorded on a surface of an article to be confirmed or the protection material affixed to the relevant article to be confirmed, a determination device that, when the fine characteristics are read from the article to be confirmed by the reading device, compares the relevant read fine characteristics with the characteristic information read by the characteristic information reading device, and determines the authenticity of the relevant article to be confirmed based on the relevant comparison result.

In the above-described article confirming device, the reading device can read the fine characteristics from the protection material affixed to the relevant article instead of the protection-material affixed portion of the article, so that the article whose fine characteristics are difficult to read can be addressed.

Furthermore, in the above-described article confirming device, as the protection material, a transparent film in which a transparent adhesive layer is formed on the side of an affixing surface to the article can be used, and in this case, the adhesive layer is advantageously formed of an adhesive component that is fixed in a transparent state when a predetermined time passes after being attached to the article. Further, as the protection material, thermoplastic resin that is transparent at ambient temperatures can be also used.

In the above-described article confirming device, the surface of the protection material may be covered by a second protection layer that can be peeled off.

As described above, the invention improves the forgery prevention effect, and can confirm the authenticity of the article with ease and at high precision.

What is claimed is:

1. An article confirmation method comprising:

affixing a protection material comprising a transparent film to a region of a genuine article;

reading irreproducible fine characteristics from the region;

recording information of the irreproducible fine characteristics of the genuine article, wherein the irreproducible fine characteristics of the genuine article are originally possessed by the genuine article, and the information is recorded on the protection material affixed to the genuine article;

storing the information of the irreproducible characteristics of the genuine article;

reading information of irreproducible fine characteristics from a region of an article to be confirmed, a protection material comprising a transparent film being affixed to the region, wherein the irreproducible fine characteristics are originally possessed by the article to be confirmed, and the information is read from the article to be confirmed or from the protection material affixed to the article to be confirmed;

comparing the information of the irreproducible fine characteristics between the genuine article and the article to be confirmed; and determining authenticity of the article to be confirmed based on a comparison result.

2. The article confirmation method of claim 1, comprising:

recording an identification code for identifying the genuine article on the protection material affixed to the genuine article;

recording the information of the irreproducible fine characteristics of the genuine article in association with the identification code;

reading an identification code from the article to be confirmed or the protection material affixed to the article to be confirmed; and comparing the information of the irreproducible fine characteristics read from the article to be confirmed with the information associated with the read identification code.

3. The article confirmation method of claim 1, wherein when the irreproducible fine characteristics of the genuine article are difficult to read, before affixing the protection material, random flaws are generated on a surface which the protection material of the genuine article is affixed.

4. The article confirmation method of claim 3, wherein the flaws are generated by scraping physically or generated by treating (or etching) chemically.

5. The article confirmation method of claim 1, wherein the protection material is a transparent film in which a transparent adhesive layer is formed on the side of a surface of the transparent film that is to be affixed to the article.

6. The article confirmation method of claim 5, wherein the adhesive layer is formed of an adhesive component that is fixed in a transparent state when a predetermined time passes after being attached to the article.

7. The article confirmation method of claim 1, wherein the protection material is a thermoplastic resin that is transparent at ambient temperatures.

8. The article confirmation method of claim 1, wherein the region of the protection material is covered by a second protection layer that can be peeled off.

9. An article confirming device comprising:

a reading device that reads irreproducible fine characteristics from a protection-material affixed portion of a genuine article in which a protection material comprising a transparent film is affixed to a surface of the genuine article, wherein the irreproducible fine characteristics of the protection-material affixed portion of the genuine article are originally possessed by the genuine article, and information of the irreproducible fine characteristics of the genuine article is recorded on the protection material affixed to the genuine article;

a storage device that records information of the irreproducible fine characteristics read by the reading device;

a determination device that compares the information of the irreproducible fine characteristics in the storage device with information of the irreproducible fine characteristics read from an article to be confirmed, and determines the authenticity of the article to be confirmed based on a comparison result.

10. The article confirming device of claim 9, wherein the determination device compares the information of the irreproducible fine characteristics read from the article to be confirmed with all pieces of the information of the irreproducible fine characteristics recorded in the storage device.

11. The article confirming device of claim 9, further comprising:

an identification code generation unit that generates an identification code for identifying the genuine article and records the identification code in advance on the protection material affixed to the genuine article; and an identification code reading device that reads the identification code;

wherein the storage device stores the information of the irreproducible fine characteristics in association with the identification code read by the identification code reading device from the protection material affixed to the genuine article; and the determination device compares the information of the irreproducible fine characteristics read from a protection-material affixed portion of the article to be confirmed with the information of the irreproducible fine characteristics associated with the identification code read by the identification code reading device from the protection material affixed to the article to be confirmed.

12. The article confirming device of claim 9, wherein the reading device can read the irreproducible fine characteristics from the protection material affixed to the article to be confirmed or from the genuine article instead of from the protection-material affixed portion of the article to be confirmed or the genuine article.

13. The article confirming device of claim 9, wherein the protection material is a transparent film in which a transparent adhesive layer is formed on the side of a surface thereof that is to be affixed to the article.

14. The article confirming device of claim 13, wherein the adhesive layer is formed of an adhesive component that is fixed in a transparent state when a predetermined time passes after being attached to the article.

15. The article confirming device of claim 9, wherein the protection material is a thermoplastic resin that is transparent at ambient temperatures.

16. The article confirming device of claim 9, wherein the surface of the protection material is covered by a second protection layer that can be peeled off.

17. An article confirming device which confirms the authenticity of an article, comprising:

a reading device that reads irreproducible fine characteristics from a protection-material affixed portion of a genuine article in which a protection material comprising a transparent film is affixed to a surface thereof wherein the irreproducible fine characteristics of the protection material affixed portion of the genuine article are originally possessed by the genuine article, and information of the irreproducible fine characteristics of the genuine article is recorded on the protection material affixed to the genuine article;

a recording device that, when the irreproducible fine characteristics are read from the genuine article by the reading device, records information of the irreproducible fine characteristics indicating the read fine characteristics on the protection material affixed to the genuine article;

an information reading device that reads the information of irreproducible fine characteristics recorded on a protection material comprising a transparent film affixed to an article to be confirmed wherein the irreproducible fine characteristics of the article to be confirmed are originally possessed by the article to be confirmed;

a determination device that, when the irreproducible fine characteristics are read from the article to be confirmed, compares the information of the irreproducible fine characteristics read from the article to be confirmed with the information of the irreproducible fine characteristics read by the reading device, and determines the authenticity of the article to be confirmed based on the comparison result.

18. The article confirming device of claim 17, wherein the reading device can read the irreproducible fine characteristics from the protection material affixed to the genuine article or article to be confirmed.

19. The article confirming device of claim 18, wherein the protection material is a transparent film in which a transparent adhesive layer is formed on the side of a surface thereof that is to be affixed to the genuine article or article to be confirmed.

20. The article confirming device of claim 19, wherein the adhesive layer is formed of an adhesive component that is fixed in a transparent state when a predetermined time passes after being attached to the article.

21. The article confirming device of claim 20, wherein the protection material is a thermoplastic resin that is transparent at ambient temperatures.

22. The article confirming device of claim 21, wherein the surface of the protection material is covered by a second protection layer that can be peeled off.

23. An article confirmation method comprising:

reading irreproducible fine characteristics from a region of a genuine article covered by a protection material comprising a transparent film, wherein the irreproducible fine characteristics are originally possessed by the genuine article, and information of the irreproducible fine characteristics of the genuine article is recorded on the protection material affixed to the genuine article;

reading irreproducible fine characteristics from a region of an article to be confirmed covered by a protection material comprising a transparent film, wherein the irreproducible fine characteristics are originally possessed by the article to be confirmed;

comparing the information of the irreproducible fine characteristics between the genuine article and the article to be confirmed; and determining authenticity of the article to be confirmed based on a comparison result.

24. The article confirmation method of claim 23, wherein the protection material is designed to penetrate into gaps and wrinkles.

25. The article confirmation method of claim 24, wherein the protection material is ethylene vinyl acetate.

* * * * *